United States Patent
Ohkoshi et al.

(10) Patent No.: US 11,315,595 B2
(45) Date of Patent: Apr. 26, 2022

(54) RECORDING METHOD, RECORDING DEVICE, REPRODUCTION METHOD, REPRODUCTION DEVICE, AND HIGH-SPEED RESPONSE ELEMENT

(71) Applicants: THE UNIVERSITY OF TOKYO, Tokyo (JP); OSAKA UNIVERSITY, Suita (JP); FUJIFILM Corporation, Tokyo (JP)

(72) Inventors: Shin-ichi Ohkoshi, Tokyo (JP); Makoto Nakajima, Osaka (JP); Masashi Shirata, Minamiashigara (JP); Hiroaki Doshita, Minamiashigara (JP)

(73) Assignees: THE UNIVERSITY OF TOKYO, Tokyo (JP); OSAKA UNIVERSITY, Osaka (JP); FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/035,077

(22) Filed: Sep. 28, 2020

(65) Prior Publication Data

US 2021/0027806 A1    Jan. 28, 2021

Related U.S. Application Data

(63) Continuation of application No. PCT/JP2018/044691, filed on Dec. 5, 2018.

(30) Foreign Application Priority Data

Mar. 29, 2018    (JP) .............................. JP2018-065699

(51) Int. Cl.
  G11B 11/105    (2006.01)
  G11B 5/706    (2006.01)
  G11B 5/012    (2006.01)

(52) U.S. Cl.
  CPC .......... G11B 5/70642 (2013.01); G11B 5/012 (2013.01)

(58) Field of Classification Search
  CPC .............. G11B 5/70678; G11B 5/7358; G11B 5/00817; G11B 5/712; G11B 5/714;
  (Continued)

(56) References Cited

U.S. PATENT DOCUMENTS 7,075,055 B2 * 7/2006 Nagai .................. G01R 33/032
                                                              250/225
7,781,082 B2 * 8/2010 Ohkoshi ................ C01G 49/06
                                                              428/836.2
(Continued)

FOREIGN PATENT DOCUMENTS

CN      1191036 A     8/1998
JP      4-222946 A    8/1992
(Continued)

OTHER PUBLICATIONS

Shin-Ichi Ohkoshi et al., "Nanometer-size hard magnetic ferrite exhibiting high optical-transparency and nonlinear optical-magnetoelectric effect", Scientific Reports, Oct. 6, 2015, pp. 1-9, vol. 5, No. 14414.

(Continued)

*Primary Examiner* — Nabil Z Hindi
(74) *Attorney, Agent, or Firm* — Sughrue Mion, PLLC

(57) ABSTRACT

The present invention provides a recording method and a recording device in which information can be easily recorded even in a magnetic recording medium using epsilon iron oxide particles having a high coercive force as a magnetic recording material. A recording device of the invention applies an external magnetic field $H_0$ that inclines magnetization of epsilon iron oxide particles to a particle dispersion element containing epsilon iron oxide particles, (Continued)

and irradiates the particle dispersion element with light that excites the magnetization. Accordingly, the recording device is capable of inverting magnetization that is not capable of being inverted only by the external magnetic field, in accordance with a synergetic effect between the inclination of the magnetization and the light excitation of the magnetization.

11 Claims, 17 Drawing Sheets

(58) Field of Classification Search
CPC ... G11B 5/7356; G11B 5/653; G11B 5/73917; G11B 5/8404; G11B 5/5926; G11B 5/78; G11B 5/71; G11B 5/70605; G11B 5/73; G11B 5/00813; G11B 5/584; G11B 5/845; G11B 5/708; G11B 5/7006; G11B 5/852; G11B 20/10055; G11B 5/7042; G11B 5/70621; G11B 11/10; G11B 11/105; G11B 2005/0021; H01F 1/348; H01F 1/344; C01G 49/06; C01P 2006/42; C01P 2004/04
USPC .................................................. 360/48, 59
See application file for complete search history.

(56) References Cited

U.S. PATENT DOCUMENTS

| | | | |
|---|---|---|---|
| 8,335,037 B2 * | 12/2012 | Takeda ..................... | H01P 1/32 359/484.1 |
| 9,384,774 B1 | 7/2016 | Nookala et al. | |
| 10,115,425 B2 | 10/2018 | Shimizu et al. | |
| 2012/0100064 A1 * | 4/2012 | Ohkoshi ................ | H01F 41/24 423/633 |
| 2014/0219069 A1 | 8/2014 | Hattori et al. | |
| 2017/0162220 A1 * | 6/2017 | Nakashio ........... | G11B 5/70621 |
| 2018/0366151 A1 | 12/2018 | Ohkoshi et al. | |
| 2019/0035521 A1 | 1/2019 | Ohkoshi et al. | |

FOREIGN PATENT DOCUMENTS

| | | |
|---|---|---|
| JP | 5-314412 A | 11/1993 |
| JP | 9-245391 A | 9/1997 |
| JP | 2000-057649 A | 2/2000 |
| JP | 2000-285544 A | 10/2000 |
| JP | 2004-087041 A | 3/2004 |
| JP | 2011-039008 A | 2/2011 |
| JP | 5124825 B2 | 1/2013 |
| JP | 2014-154178 A | 8/2014 |
| JP | 2017-199446 A | 11/2017 |
| WO | 2017/094752 A1 | 6/2017 |
| WO | 2017/126618 A1 | 7/2017 |

OTHER PUBLICATIONS

Shunsuke Sakurai et al., "First Observation of Phase Transformation of All Four $Fe_2O_3$ Phases ($\gamma \to \varepsilon \to \beta\alpha$-Phase)", J. Am. Chem. Soc., 2009, pp. 18299-18303, vol. 131.

Asuka Namai et al., "Synthesis of an Electromagnetic Wave Absorber for High-Speed Wireless Communication", J. Am. Chem. Soc., 2009, pp. 1170-1173, vol. 131.

Asuka Namai et al., "Hard magnetic ferrite with a gigantic coercivity and high frequency millimetre wave rotation", Nature Communications, Sep. 4, 2012, pp. 1-6, vol. 3, No. 1035.

International Search Report for PCT/JP2018/044691 dated, Mar. 3, 2019 (PCT/ISA/210).

Office Action dated Mar. 22, 2021, from The State Intellectual Property Office of the P.R. of China in Chinese Application No. 201880091924.3.

Office Action dated Apr. 23, 2021, issued by the Korean Intellectual Property Office in Korean Application No. 10-2020-7026154.

Han et al, "The Study about the Magnetization Reversal Dynamics of the Magneto-optic Recording", Proceedings of Symposium of the Korean Institute of Communications and Information Sciences, 1991, pp. 238-241 (5 Pages Total).

Office Action dated Nov. 25, 2021 from the European Patent Office in EP Application No. 18911675.9.

* cited by examiner

RECORDING METHOD, RECORDING DEVICE, REPRODUCTION METHOD, REPRODUCTION DEVICE, AND HIGH-SPEED RESPONSE ELEMENT

TECHNICAL FIELD

The present invention relates to a recording method, a recording device, a reproduction method, a reproduction device, and a high-speed response element, and is preferably applied to a magnetic recording medium or the like using epsilon iron oxide particles.

BACKGROUND ART

In a magnetic recording medium, there has been a demand for the miniaturization of magnetic particles in order for the densification of recording, and recently, a magnetic recording medium using epsilon iron oxide particles in which the magnetic particles can be miniaturized has attracted attention. In accordance with the miniaturization of the magnetic particles, an S/N ratio of a signal can be increased, whereas it is considered that the stability of the magnetization with respect to heat is proportional to a magnetic anisotropic constant and a particle volume, and thus, thermal stability of the magnetization is impaired by the miniaturization.

Here, it is considered that the magnetic anisotropic constant can be increased by increasing a coercive force of the magnetic recording medium. Accordingly, in order to obtain particles having a small particle volume (particle diameter) and high thermal stability, it is effective to use a substance having a high coercive force as a magnetic material. For example, in PTL 1 and Non-NPLs 1 to 4, the inventors have disclosed epsilon iron oxide particles in which a coercive force $H_c$ of greater than 20 kOe ($1.59 \times 10^6$ A/m) is observed in a magnetic hysteresis loop that is measured by applying an external magnetic field in a parallel direction to an orientation direction of a magnetization easy axis.

CITATION LIST

Patent Literature

PTL 1: Japanese Patent No. 5,124,825

Non Patent Literature

NPL 1: S. Ohkoshi, A. Namai, K. Imoto, M. Yoshikiyo, W. Tarora, K. Nakagawa, M. Komine, Y. Miyamoto, T. Nasu, S. Oka, and H. Tokoro, Scientific Reports, 5, 14414/1-9 (2015).
NPL 2: S. Sakurai, A. Namai, K. Hashimoto, and S. Ohkoshi, J. Am. Chem. Soc., 131, 18299-18303 (2009).
NPL 3: A. Namai, S. Sakurai, M. Nakajima, T. Suemoto, K. Matsumoto, M. Goto, S. Sasaki, and S. Ohkoshi, J. Am. Chem. Soc., 131, 1170-1173 (2009).
NPL 4: A. Namai, M. Yoshikiyo, K. Yamada, S. Sakurai, T. Goto, T. Yoshida, T Miyazaki, M. Nakajima, T. Suemoto, H. Tokoro, and S. Ohkoshi, Nature Communications, 3, 1035/1-6 (2012).

SUMMARY OF INVENTION

Technical Problem

However, in a case where the coercive force $H_c$ of the magnetic recording medium is high, it is necessary to generate a high external magnetic field by using a magnetic head having a saturated magnetic flux density at a high level, and to record information in the magnetic recording medium. The external magnetic field that is generated by the magnetic head, in general, is also regarded as being proportional to a saturated magnetic flux density of a soft magnetic film to be used, and currently, a hard disk having a coercive force $H_c$ of approximately 1.5 to 4.5 kOe ($1.19 \times 10^5$ A/m to $3.58 \times 10^5$ A/m) has been reported, but in a record writing magnetic head of such a hard disk, a material having a high saturated magnetic flux density such as a saturated magnetic flux density of 2.4 T has been used.

As seen in PTL 1 described above, in a case where epsilon iron oxide particles having a huge coercive force $H_c$ at a level of 20 kOe ($1.59 \times 10^6$ A/m) are used in the magnetic recording material of the magnetic recording medium, it is difficult to record information to the magnetic recording medium unless there is a material having a saturated magnetic flux density higher than the current saturated magnetic flux density.

Therefore, the invention has been made in consideration of the above, and an object thereof is to propose a recording method and a recording device in which information can be easily recorded even in a magnetic recording medium using epsilon iron oxide particles having a high coercive force as a magnetic recording material.

Another object of the invention is to propose a reproduction method and a reproduction device in which information can be reproduced even in a case where the information is recorded in a magnetic recording medium using epsilon iron oxide particles as a magnetic recording material in a multi-valued manner.

Recently, new properties of the epsilon iron oxide particles have been found, and there has also been a demand for the development of a novel element using such properties. The invention has also been made in consideration of the above, and an object thereof is to propose a novel high-speed response element using epsilon iron oxide particles.

Solution to Problem

In order to attain such objects, a recording method according to the invention, includes: performing application of an external magnetic field and irradiation of light to a magnetic recording medium using epsilon iron oxide particles as a magnetic recording material to invert magnetization of the epsilon iron oxide particles.

A recording device of the invention, includes: a magnetic field application unit that is configured to apply an external magnetic field to a magnetic recording medium containing epsilon iron oxide particles; and a light irradiation unit that is configured to irradiate the magnetic recording medium with light, in which magnetization of the epsilon iron oxide particles is inverted by the external magnetic field and the light.

A reproduction method of the invention, includes: detecting magnetization of a magnetic recording medium using epsilon iron oxide particles as a magnetic recording material, in which information is capable of being recorded in a multi-valued manner; and reproducing information in accordance with intensity of the magnetization, on the basis of the intensity of the magnetization detected from the magnetic recording medium.

A reproduction device of the invention, includes: a detection unit that is configured to detect magnetization of a magnetic recording medium using epsilon iron oxide particles as a magnetic recording material, in which information is capable of being recorded in a multi-valued manner; and an information reproduction unit that is configured to reproduce information in accordance with intensity of the magnetization, on the basis of the intensity of the magnetization detected from the magnetic recording medium.

A high-speed response element of the invention, contains: epsilon iron oxide particles, in which a magnetization state responds in conformance with a timing when terahertz light is applied.

Advantageous Effects of Invention

According to the invention, a magnetic recording medium using epsilon iron oxide particles is irradiated with light, and thus, it is possible to decrease an external magnetic field that is required to invert magnetization, compared to a case where the magnetic recording medium is not irradiated with light. Accordingly, even in a magnetic recording medium using epsilon iron oxide particles having a high coercive force, it is possible to easily record information in a low external magnetic field by irradiating the magnetic recording medium with light.

According to the reproduction method and the reproduction device of the invention, even in a case where information is recorded in a magnetic recording medium in a multi-valued manner by changing the intensity of light at the time of recording the information by an external magnetic field and light, it is possible to reproduce multi-valued information by detecting the intensity of the magnetization.

According to the invention, it is possible to attain a novel high-speed response element in which a magnetization state responds at a high speed in conformance with a timing when terahertz light is applied.

BRIEF DESCRIPTION OF DRAWINGS

FIG. 11A is a graph showing a region of an external magnetic field of ±50 kOe.

DESCRIPTION OF EMBODIMENTS

Figure 1:
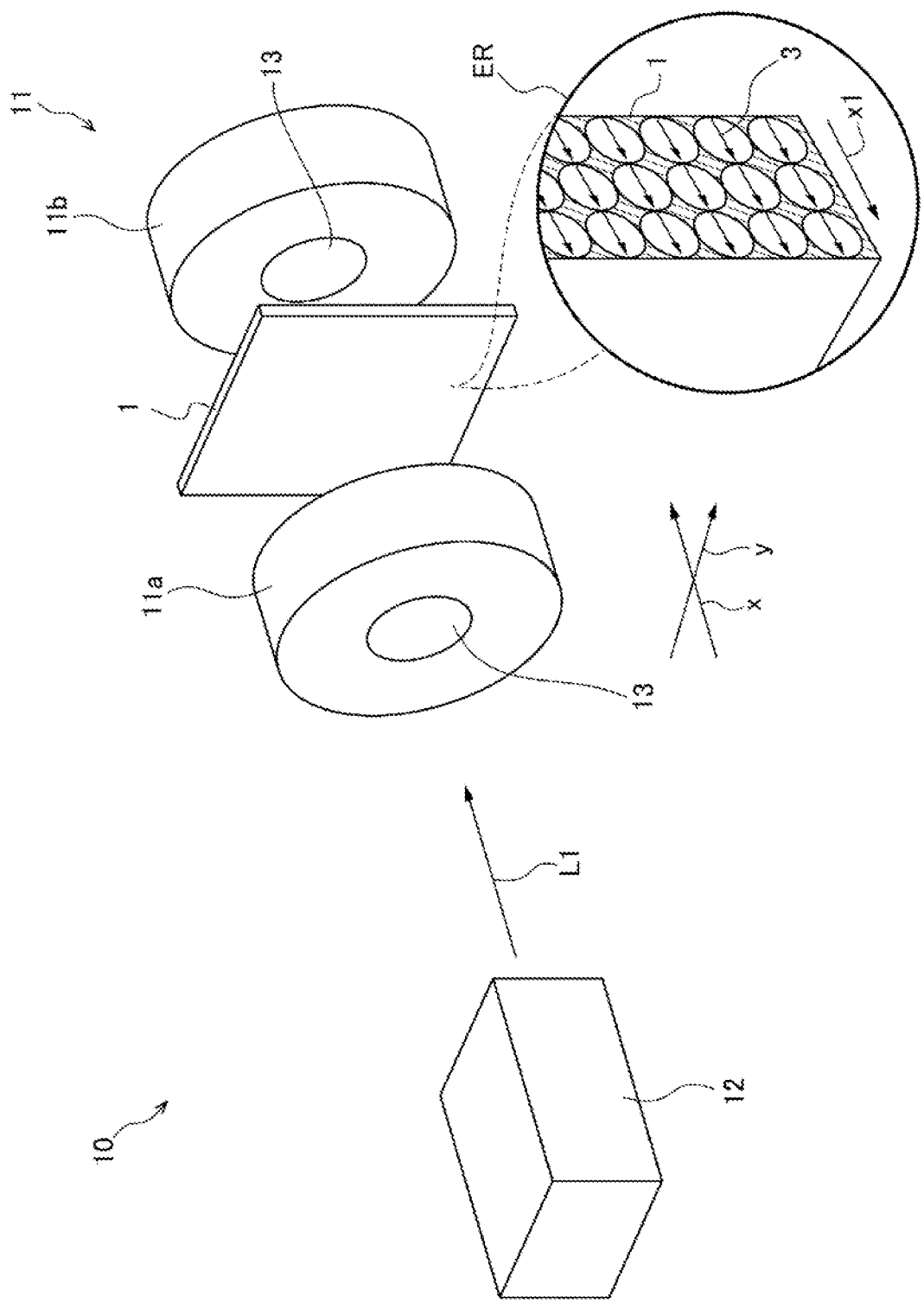
FIG. 1 is a schematic view illustrating an overall configuration of a recording device according to the invention.

Hereinafter, embodiments of the invention will be described in detail, on the basis of the drawings.

(1) Epsilon Iron Oxide Particles Used as Magnetic Recording Material in Recording Device of Invention As a magnetic recording medium of a recording device of the invention, it is desirable to apply a magnetic recording medium using epsilon iron oxide particles having a high coercive force $H_c$ as a magnetic recording material. In the invention, even in a case where the epsilon iron oxide particles having a high coercive force $H_c$ are used as the magnetic recording material, the epsilon iron oxide particles are irradiated with light, and thus, it is possible to invert magnetization in a low external magnetic field and to record information, without using a magnetic head having a saturated magnetic flux density at a high level.

Here, first, the epsilon iron oxide particles having a high coercive force $H_c$, which are used in this embodiment, will be described below. As the epsilon iron oxide particles, any crystals represented by general formulas of $\varepsilon\text{-Fe}_2O_3$, $\varepsilon\text{-A}_x\text{Fe}_{2-x}O_3$ (A is an element excluding Fe, and x is in a range of $0<x<2$), $\varepsilon\text{-B}_y\text{C}_z\text{Fe}_{2-y-z}O_3$ (here, B and C are elements excluding A and Fe and are elements different from each other, y is in a range of $0<y<1$, and z is in a range of $0<z<1$), and $\varepsilon\text{-D}_U\text{E}_V\text{F}_W\text{Fe}_{2-U-V-W}O_3$ (here, D, E, and F are elements excluding A and Fe and are elements different from each other, U is in a range of $0<U<1$, V is in a range of $0<V<1$, and W is in a range of $0<W<1$) are desirable.

$\varepsilon\text{-A}_x\text{Fe}_{2-x}O_3$ has the same crystalline system and the same space group as those of $\varepsilon\text{-Fe}_2O_3$, in which a part of a Fe site of the $\epsilon$-Fe$_2$O$_3$ crystals is substituted with the element A other than Fe. In order to stably retain a crystalline structure of $\epsilon$-Fe$_2$O$_3$, it is preferable to use a trivalent element as A. Further, examples of A are capable of including one type of element selected from Al, Sc, Ti, V, Cr, Ga, In, Y, and Rh.

$\epsilon$-B$_y$C$_z$Fe$_{2-y-z}$O$_3$ has the same crystalline system and the same space group as those of $\epsilon$-Fe$_2$O$_3$, in which a part of a Fe site of the $\epsilon$-Fe$_2$O$_3$ crystals is substituted with two types of elements B and C other than Fe. In order to stably retain a crystalline structure of $\epsilon$-Fe$_2$O$_3$, it is preferable to use a tetravalent element as B and to use a divalent element as C. Further, examples of B are capable of including Ti, and examples of C are capable of including one type of element selected from Co, Ni, Mn, Cu, and Zn.

$\epsilon$-D$_U$E$_V$F$_W$Fe$_{2-U-V-W}$O$_3$ has the same crystalline system and the same space group as those of $\epsilon$-Fe$_2$O$_3$, in which a part of a Fe site of the $\epsilon$-Fe$_2$O$_3$ crystals is substituted with three types of elements D, E, and F other than Fe. In order to stably retain a crystalline structure of $\epsilon$-Fe$_2$O$_3$, it is preferable to use a trivalent element as D, to use a tetravalent element as E, and to use a divalent element as F. Examples of D are capable of including one type of element selected from Al, Sc, Ti, V, Cr, Ga, In, Y, and Rh. In addition, examples of E are capable of including Ti, and examples of F are capable of including one type of element selected from Co, Ni, Mn, Cu, and Zn.

The reason for excluding Fe from A, B, C, D, E, and F described above is because a part of a Fe$^{3+}$ ion site of $\epsilon$-Fe$_2$O$_3$ is substituted with one type of element, or two types or three types of elements different from each other. Here, a particle diameter of the epsilon iron oxide particles is not particularly limited, and for example, it is desirable that an average particle diameter measured from a transmission-type electron microscope (TEM) picture is in a range of 5 nm to 200 nm, and in order to increase a recording density of the magnetic recording medium, the average particle diameter is more desirably 100 nm or less, is even more desirably 50 nm or less, and is still even more desirably 20 nm or less.

Such epsilon iron oxide particles are known. The epsilon iron oxide particles containing any of the $\epsilon$-A$_x$Fe$_{2-x}$O$_3$ crystals, the $\epsilon$-B$_y$C$_z$Fe$_{2-y-z}$O$_3$ crystals, and the $\epsilon$-D$_U$E$_V$F$_W$Fe$_{2-U-V-W}$O$_3$ crystals in which a part of the Fe site is substituted with each of one type of element A, two types of elements B and C, and three types of elements D, E, and F, other than Fe, for example, can be synthesized by a step in which a reverse-micelle method and a sol-gel method are combined, and a burning step. In addition, as disclosed in JP-A-2008-174405, the epsilon iron oxide particles can be synthesized by a step in which a direct synthesis method and a sol-gel method are combined, and a burning step.

A more specific manufacturing method, for example, is disclosed in "Jian Jin, Shinichi Ohkoshi and Kazuhito Hashimoto, ADVANCED MATERIALS 2004, 16, No. 1, January 5, p. 48-51" or "Shin-ichi Ohkoshi, Shunsuke Sakurai, Jian Jin, Kazuhito Hashimoto, JOURNAL OF APPLIED PHYSICS, 97, 10 K312 (2005)", which is known literature, and thus, here, the description thereof will be omitted.

(2) Particle Dispersion Element Containing Epsilon Iron Oxide Particles

A particle dispersion element used in the recording device of this embodiment, for example, is manufactured as follows. A dispersion liquid obtained by dispersing the epsilon iron oxide particles described above in a predetermined solvent is provided on a base. For example, a polyester film is pasted onto a glass substrate, and the dispersion liquid is dropped onto the film. The dispersion liquid provided on the base is placed at a magnetic flux density of 2 teslas or more from the viewpoint of increasing orientation reliability, and the dispersion liquid is cured, and thus, a film-like particle dispersion element can be obtained. Note that, a detailed manufacturing method of such a film-like particle dispersion element is disclosed in JP-A-2016-135737, and thus, here, the description thereof will be omitted.

In the particle dispersion element that is manufactured as described above, for example, it is desirable that the value of the degree of orientation of magnetic particles, which is defined by Degree of Orientation=SQ (Magnetization Easy Axis Direction)/SQ (Magnetization Hard Axis Direction), is greater than 0.6. In addition, in the particle dispersion element in which the magnetization easy axis of the epsilon iron oxide particles is oriented toward a predetermined direction, it is desirable that the coercive force $H_c$ at a room temperature is 3 kOe ($2.39 \times 10^5$ A/m) or more.

(3) Recording Device Using Light (3-1) Configuration of Recording Device Using Light Next, the recording device that is capable of recording information in the particle dispersion element having a high coercive force $H_c$, described above, will be described below. FIG. 1 illustrates a recording device 10 according to the invention. The recording device 10 includes a magnetic field application unit 11 and a light irradiation unit 12, and is capable of recording information by changing a magnetization direction of a particle dispersion element 1 with the magnetic field application unit 11 and the light irradiation unit 12.

The magnetic field application unit 11 includes a first coil portion 11a and a second coil portion 11b, and for example, forms an external magnetic field $H_0$ toward the second coil portion 11b from the first coil portion 11a by allowing a current to flow to the first coil portion 11a and the second coil portion 11b. In addition, in this embodiment, the first coil portion 11a and the second coil portion 11b include a through hole 13 that penetrates the thickness of a facing surface facing a recording surface, and the through hole 13 of the first coil portion 11a and the through hole 13 of the second coil portion 11b are disposed to face each other.

The recording surface of the particle dispersion element 1 is disposed between the first coil portion 11a and the second coil portion 11b such that a surface direction of the recording surface is positioned to be perpendicular to an external magnetic field direction x of the external magnetic field $H_0$. Accordingly, the external magnetic field $H_0$ is applied to the particle dispersion element 1 to be perpendicular to the recording surface. In addition, in this embodiment, the particle dispersion element 1 is disposed between the facing through holes 13 of the first coil portion 11a and the second coil portion 11b.

The light irradiation unit 12 applies light L1 at a wavelength that can be absorbed by the epsilon iron oxide particles used as the magnetic recording material. The light L1 exiting from the light irradiation unit 12 may be pulsed laser light in addition to continuous laser light, and may be an ultraviolet ray (280 nm or more and less than 400 nm) or a visible light ray (400 nm or more and 780 nm or less).

The light irradiation unit 12 applies the light L1 toward the through hole 13 of the first coil portion 11a and the second coil portion 11b, and irradiates the recording surface of the particle dispersion element 1 with the light L1 through the through hole 13 of the first coil portion 11a. The light L1 applied to the recording surface of the particle dispersion element 1 through the through hole 13 of the first coil portion 11a is transmitted through the recording surface, and exits to the outside from the through hole 13 of the second coil portion 11b.

As described above, in the recording device 10, the light L1 applied to the recording surface of the particle dispersion element 1 directly passes through the through hole 13 of the second coil portion 11b to the outside, and thus, scattered reflection of the light L1 between the first coil portion 11a and the second coil portion 11b can be suppressed, and portions other than an irradiation portion can be prevented from being affected by the light L1. Accordingly, the light irradiation unit 12 is capable of irradiating only a desired portion on the recording surface of the particle dispersion element 1 with the light L1. As described above, in the recording device 10, while applying the external magnetic field $H_0$ by the magnetic field application unit 11, it is possible to irradiate a predetermined region of the particle dispersion element 1 to which the external magnetic field $H_0$ is applied with the light L1.

In FIG. 1, a quadrilateral particle dispersion element 1 is illustrated, and for example, a strip-like particle dispersion element 1 may be used. In this case, a longitudinal direction of the particle dispersion element 1 is conveyed in a predetermined direction y orthogonal to the external magnetic field direction x, and thus, it is possible to continuously record information in the particle dispersion element 1.

(3-2) Outline of Recording Method of Information in Particle Dispersion Element Using Light Next, the outline of a recording method for recording information in the particle dispersion element 1 containing the epsilon iron oxide particles will be described below, including an orientation state of magnetization 3 in the particle dispersion element 1. An area ER in FIG. 1 is a schematic view that illustrates a sectional configuration in which a partial region of the particle dispersion element 1 is extracted and schematically illustrates the magnetization 3 in section. As illustrated in the area ER of FIG. 1, when the external magnetic field $H_0$ is not applied, in the magnetization 3 of the epsilon iron oxide particles, for example, the magnetization direction is oriented in a reverse direction (hereinafter, referred to as an initial orientation direction) x1 of the external magnetic field direction x.

Figure 2:
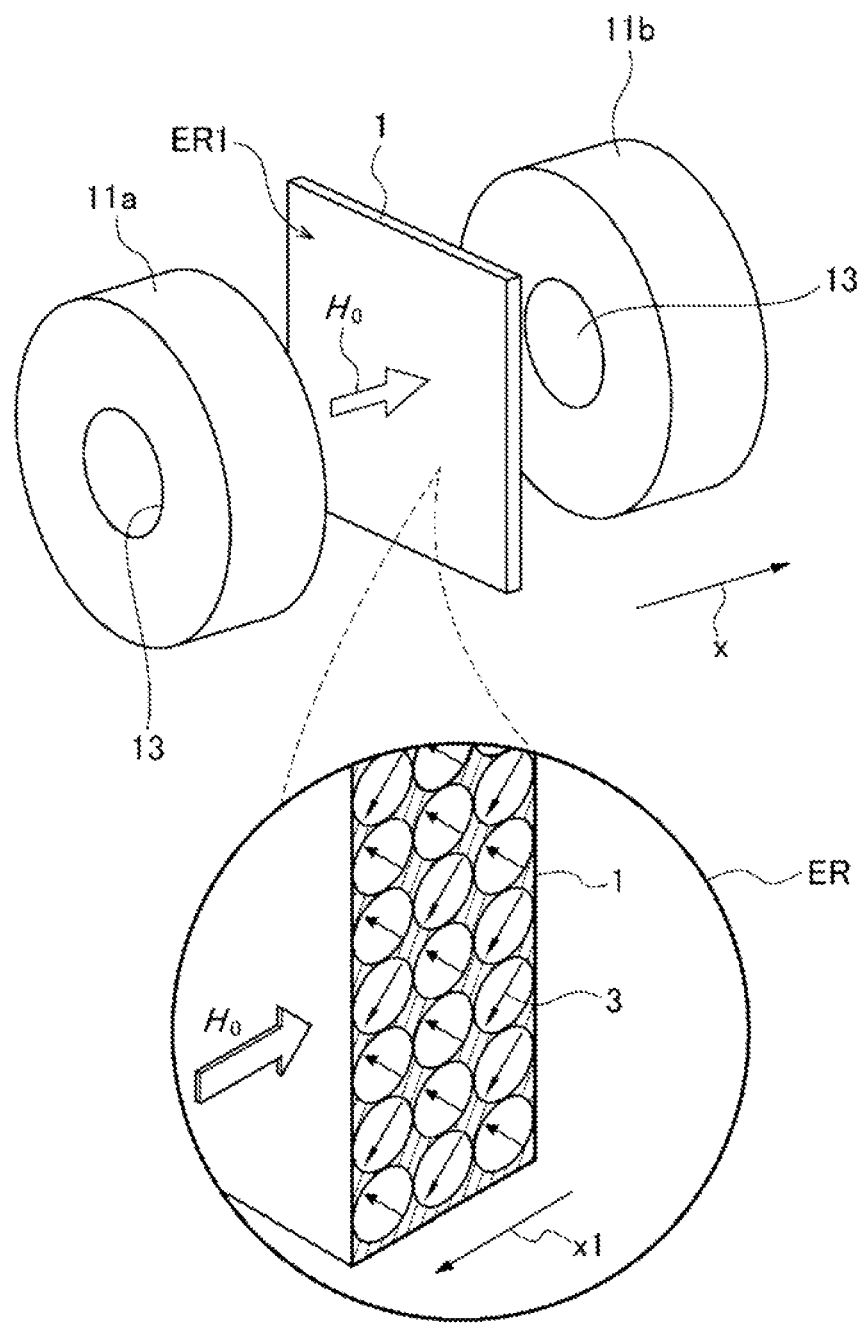
FIG. 2 is a schematic view for describing a particle dispersion element when an external magnetic field is applied to the particle dispersion element.

Next, as illustrated in FIG. 2, in a case where the external magnetic field $H_0$ is applied toward the external magnetic field direction x, in the particle dispersion element 1, the magnetization 3 in a region ER1 to which the external magnetic field $H_0$ is applied is affected by the external magnetic field $H_0$, and is inclined with respect to a thickness direction of the particle dispersion element 1 by a predetermined angle. In this embodiment, the epsilon iron oxide particles used as the magnetic recording material have a high coercive force $H_c$, and thus, it is difficult to invert the magnetization 3 by 180 degrees only with the external magnetic field $H_0$ that is applied by the magnetic field application unit 11, and the magnetization 3 is merely inclined, and thus, it is not possible to record information.

Figure 3:
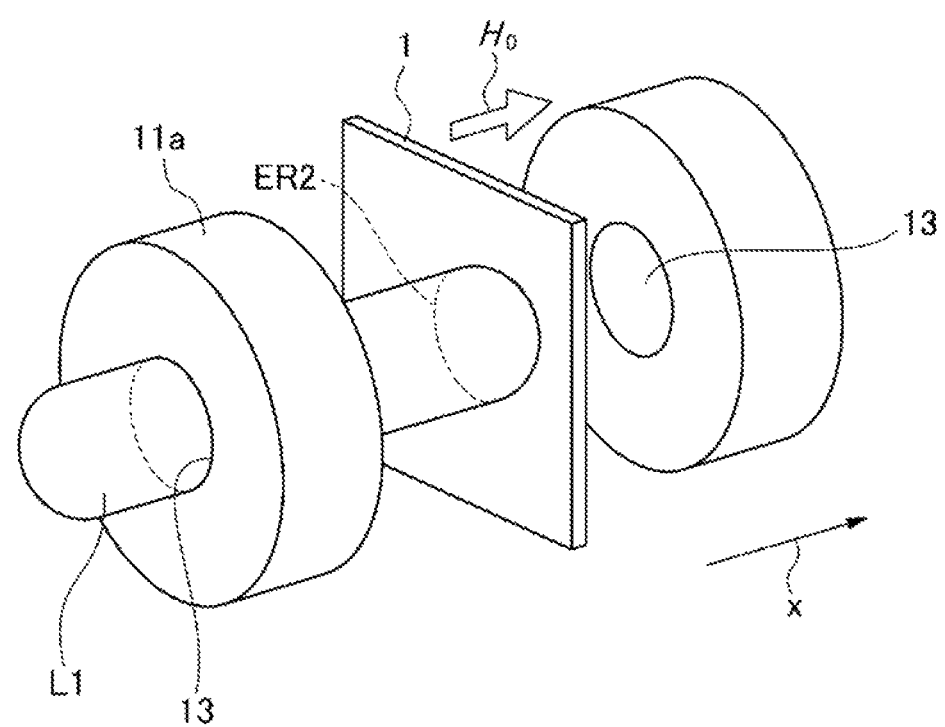
FIG. 3 is a schematic view for describing a particle dispersion element when the particle dispersion element is irradiated with light.
Figure 4:
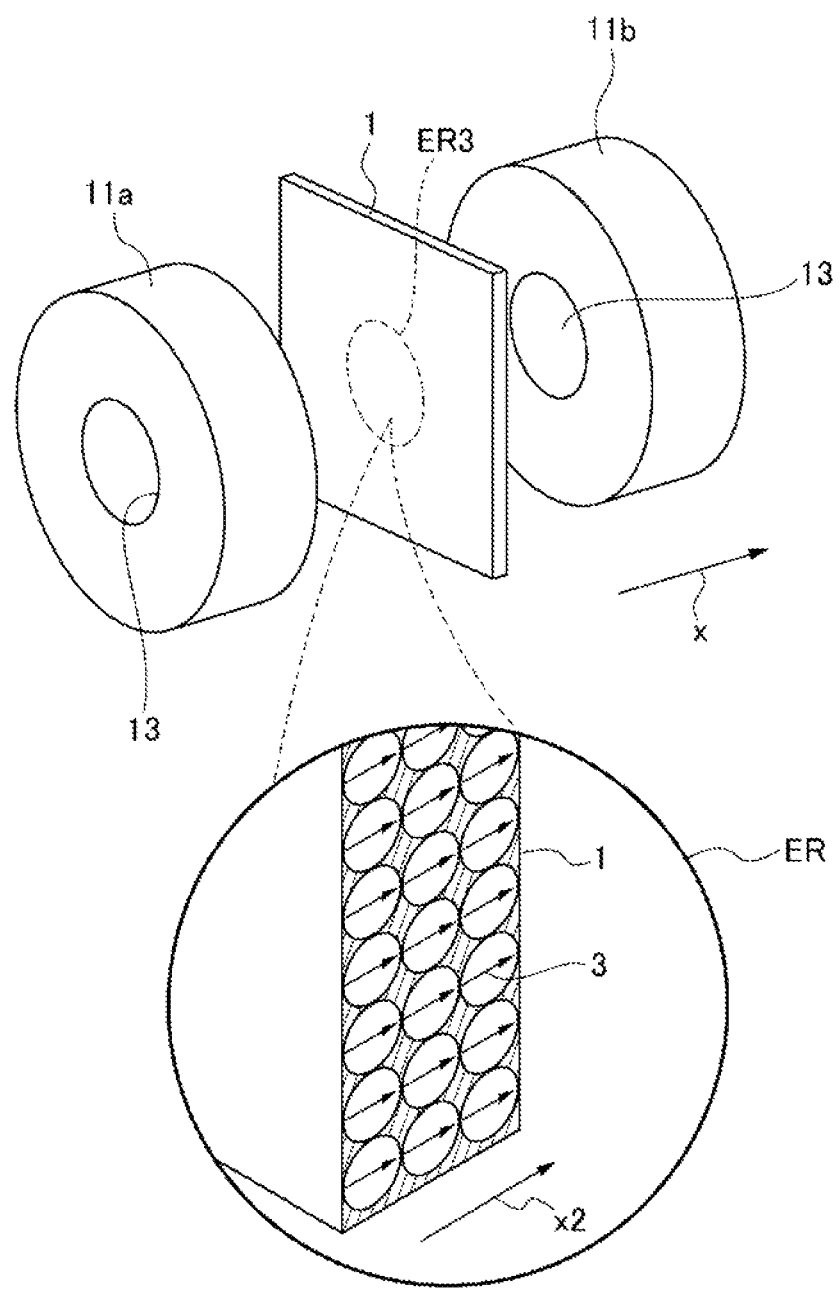
FIG. 4 is a schematic view illustrating a configuration of a particle dispersion element in which magnetization is inverted and information is recorded.

In this embodiment, as illustrated in FIG. 3, not only is the external magnetic field $H_0$ applied to the particle dispersion element 1, but also the particle dispersion element 1 is irradiated with the light L1 from the light irradiation unit 12 in a state where the external magnetic field $H_0$ is applied in the external magnetic field direction x. In an irradiation region ER2 of the light L1, the magnetization 3 that is inclined by the external magnetic field $H_0$ is excited by the light L1. As described above, in the recording device 10, the direction of the magnetization 3 is inclined by the application of the external magnetic field $H_0$, and the magnetization 3 is excited by the irradiation of the light L1, and thus, the light L1 assists magnetization inversion, and as illustrated in FIG. 4, the magnetization direction is inverted from the initial orientation direction x1 by 180 degrees.

Thus, the magnetization 3 in a region ER3 to which the external magnetic field $H_0$ is applied and the light L1 is applied is in a state in which the magnetization direction is directed to an inversion direction x2 that is inverted from the initial orientation direction x1 by 180 degrees, and information is recorded.

Here, a phenomenon that magnetization 3 is inverted by the application of the external magnetic field $H_0$ and the irradiation of the light L1 (hereinafter, also referred to as a magnetization inversion process) will be described below by using FIG. 5 and FIG. 6, from the viewpoint of potential energy.

Figure 5:
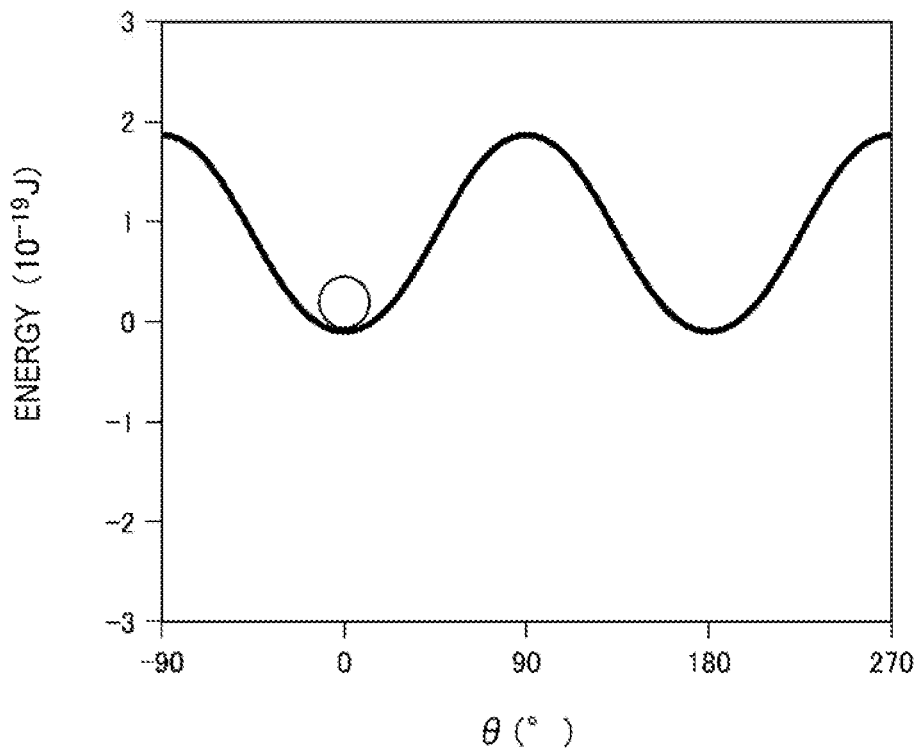
FIG. 5 is a schematic view illustrating an energy potential (before light irradiation) of a magnetization inversion process.

FIG. 5 illustrates an energy potential when the external magnetic field $H_0$ is not applied and the light L1 is not applied. The magnetization direction in a magnetization stable position directed in the initial orientation direction x1 is set to 0 degrees, and the magnetization direction in a magnetization stable position subjected to the magnetization inversion is set to 180 degrees, on a horizontal axis of FIG. 5. In this case, an energy minimum portion appears in the vicinity of 0 degrees and in the vicinity of 180 degrees, and an energy barrier of the magnetization inversion appears between 0 degrees and 180 degrees.

The magnetization in the vicinity of 0 degrees is not capable of being inverted by the energy barrier. After that, in a case where the external magnetic field $H_0$ is applied, as illustrated in FIG. 6, the energy potential is changed, and the energy potential in the vicinity of 0 degrees increases, the energy potential in the vicinity of 180 degrees decreases, and the energy minimum portion appears in the vicinity of 180 degrees. However, the energy barrier of the magnetization inversion still exists between 0 degrees and 180 degrees, and the magnetization direction of 0 degrees is maintained.

Figure 6:
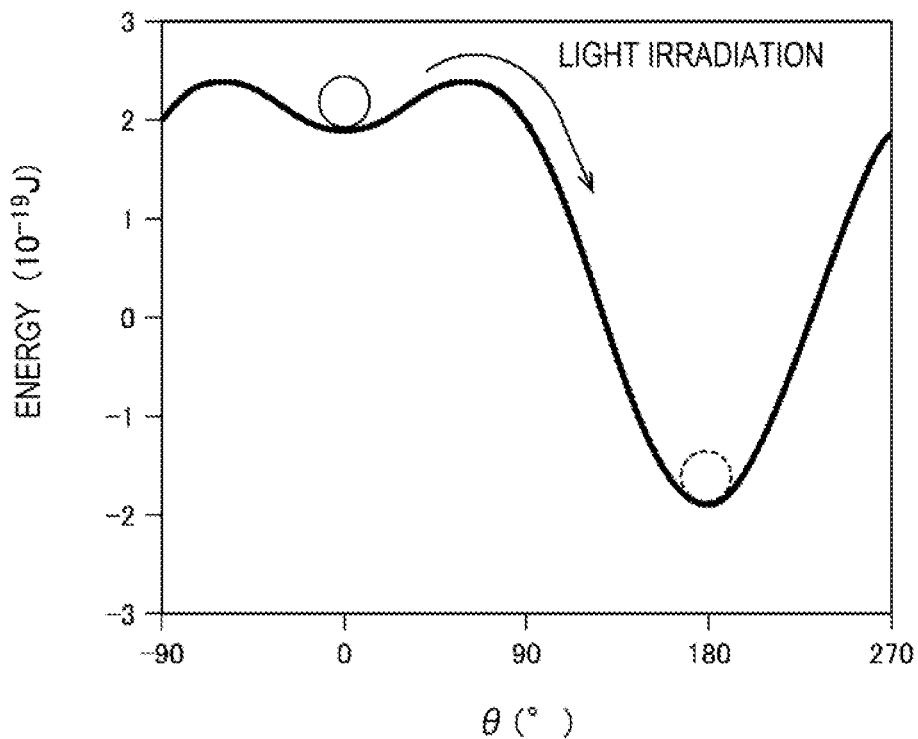
FIG. 6 is a schematic view illustrating an energy potential (at the time of applying an external magnetic field) of a magnetization inversion process and magnetization inversion due to light irradiation.

In such a state, in a case where the light L1 is applied, as illustrated in FIG. 6, energy exceeding the energy barrier of the magnetization inversion is applied, and thus, the magnetization inversion is performed, and the vicinity of 180 degrees that is the inversion direction x2 becomes the magnetization stable position.

In the embodiment described above, the case of irradiating the particle dispersion element 1 with the light L1 while applying the external magnetic field $H_0$ to the particle dispersion element 1 is described, but the invention is not limited thereto. For example, the light L1 is applied while the magnetization 3 in the particle dispersion element 1 is inclined, immediately after the application of the external magnetic field $H_0$ to the particle dispersion element 1 is ended, and thus, it is possible to assist the inversion of the magnetization 3 with the light L1.

In the embodiment described above, the case of initially applying the external magnetic field $H_0$ to the particle dispersion element 1 and of irradiating the particle dispersion element 1 to which the external magnetic field $H_0$ is applied with the light L1 is described, but the invention is not limited thereto. For example, the particle dispersion element 1 may be initially irradiated with the light L1, and the external magnetic field $H_0$ may be applied to the particle dispersion element 1 that is irradiated with the light L1, and thus, the inversion of the magnetization 3 may be assisted with the external magnetic field $H_0$. As described above, even in a case where the order of the application of the external magnetic field $H_0$ and the irradiation of the light L1 is reversed, it is possible to decrease the value of the external magnetic field $H_0$ that is required to invert the magnetization 3.

Even in a case where the order of the application of the external magnetic field $H_0$ and the irradiation of the light L1 is reversed, for example, the external magnetic field $H_0$ is applied while the magnetization 3 is excited with light in the particle dispersion element 1, immediately after the particle dispersion element 1 is irradiated with the light L1, and thus, it is also possible to assist the inversion of the magnetization 3 with the external magnetic field $H_0$.

(3-3) Operation and Effect

In the configuration described above, in the recording device 10, when information is recorded in the particle dispersion element 1 using the epsilon iron oxide particles as the magnetic recording material, the external magnetic field $H_0$ that inclines the magnetization 3 of the epsilon iron oxide particles is applied to the particle dispersion element 1, and the particle dispersion element 1 is irradiated with the light L1. Accordingly, the recording device 10 is capable of inverting the magnetization 3 that is not capable of being inverted only with the external magnetic field, by a synergetic effect between the inclination of the magnetization 3 and the light excitation of the magnetization 3.

As described above, in the recording device 10, the particle dispersion element 1 using the epsilon iron oxide particles is irradiated with the light L1, and thus, it is possible to decrease the value of the external magnetic field $H_0$ that is required to invert the magnetization 3, compared to a case where the particle dispersion element 1 is not irradiated with the light L1. Accordingly, even in the particle dispersion element 1 using the epsilon iron oxide particles having a high coercive force $H_c$, it is possible to easily record information by a low external magnetic field $H_0$.

(3-4) Validation Test

Next, a film-like particle dispersion element using epsilon iron oxide particles having a high coercive force $H_c$ as a magnetic recording material was prepared and was irradiated with light, and thus, a validation test of whether it is possible to decrease an external magnetic field $H_0$ that is required in magnetization inversion was performed. Here, first, epsilon iron oxide particles containing $\varepsilon\text{-Ga}_{0.27}\text{Ti}_{0.05}\text{Co}_{0.07}\text{Fe}_{1.61}\text{O}_3$ crystals were prepared by the following procedure.

(3-4-1) Powder Sample

The epsilon iron oxide particles containing the $\varepsilon\text{-Ga}_{0.27}\text{Ti}_{0.05}\text{Co}_{0.07}\text{Fe}_{1.61}\text{O}_3$ crystals synthesized by a known method were dispersed in a dispersion liquid containing tetramethyl ammonium hydroxide (TMAH), and were classified by a centrifugal separation treatment, and thus, a powder sample having a homogeneous particle diameter was obtained. The powder sample was observed with a transmission-type electron microscope (TEM), and thus, it was possible to check that the powder sample was spherical particles.

Figure 7:
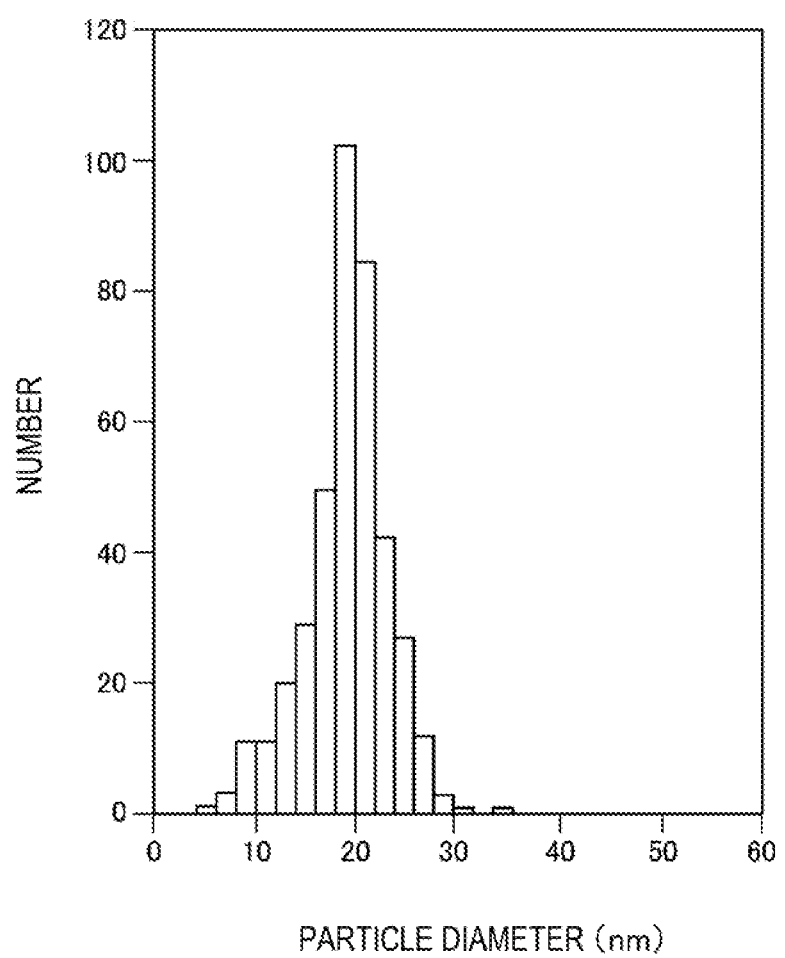
FIG. 7 is a graph showing a variation in a particle diameter of a powder sample after classification.

The particle diameter of the powder sample was examined, and thus, results as shown in FIG. 7 were obtained. As shown in FIG. 7, it was possible to check that an average particle diameter of the powder sample was 19.2±4.2 nm and the powder sample had an excellent and homogeneous particle diameter distribution.

(3-4-2) Preparation of Particle Dispersion Element

Next, the particle dispersion element 1 used in the validation test was prepared by using the classified powder sample. In the preparation of the particle dispersion element 1, a mixture in which a urethane resin and a vinyl chloride resin were mixed was prepared as a resin for a particle dispersion element, and a dispersion liquid in which the mixture and the classified powder sample were dispersed in a predetermined solvent was prepared. Next, the dispersion liquid was dropped onto a polyester film (also simply referred to as a film), was placed at a magnetic flux density of 2 T, and was dried, and thus, a transparent particle dispersion element 1 in which the dispersion liquid was cured was obtained. Note that, at this time, the film was disposed such that a magnetic flux density was applied in a perpendicular direction.

Figure 8:
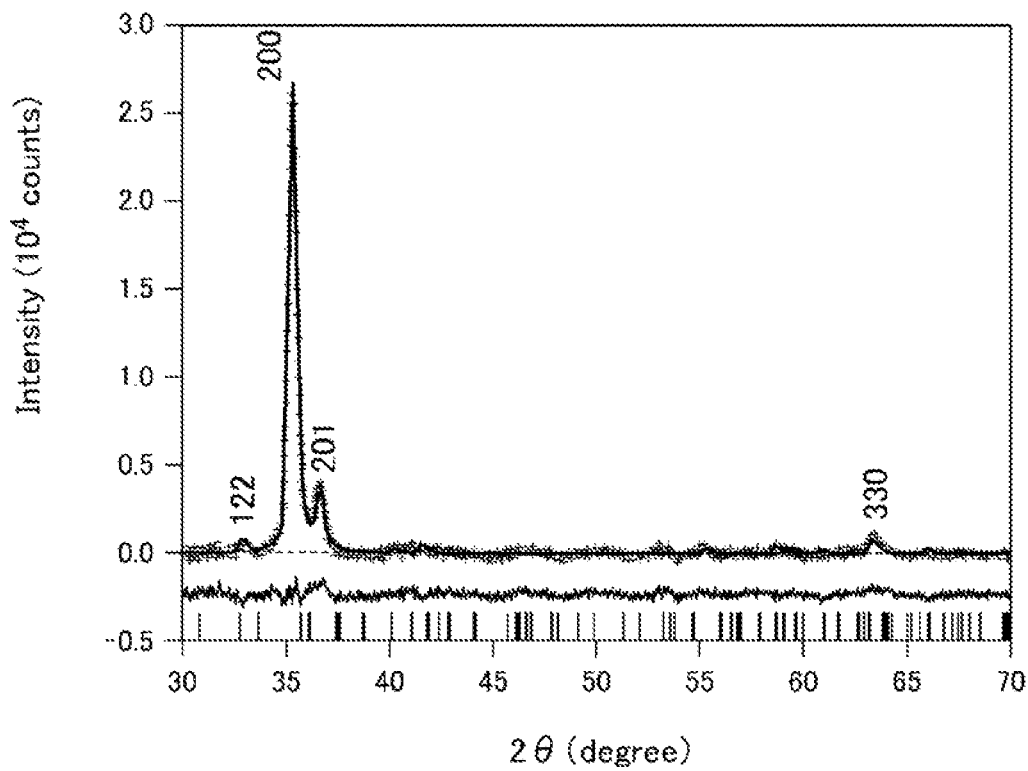
FIG. 8 is a graph showing an X-ray diffraction pattern of a particle dispersion element.

An X-ray diffraction pattern of the obtained particle dispersion element 1 was examined, and thus, results as shown in FIG. 8 were obtained. As shown in FIG. 8, a peak belonging to 200 reflections was detected. In addition, the degree of orientation of the obtained particle dispersion element 1 was examined, and thus, it was possible to check that the degree of orientation had a high value of 0.84 in a Lotgering value and the particle dispersion element 1 had excellent orientation properties.

Figure 9:
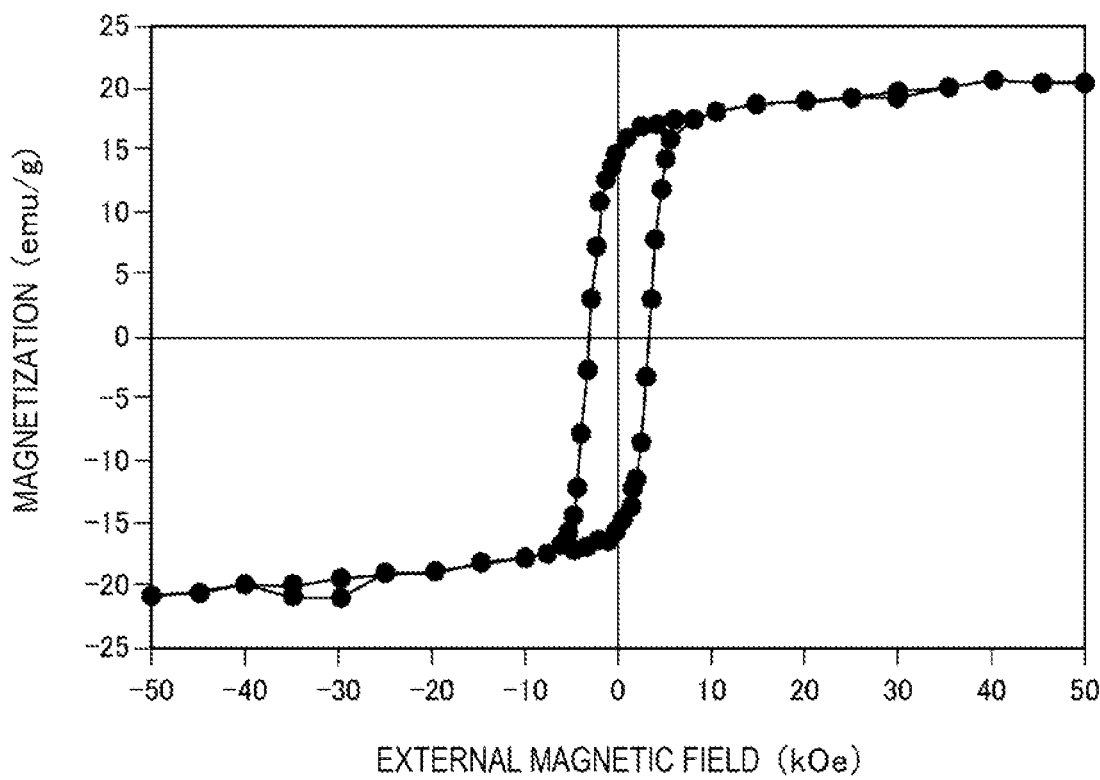
FIG. 9 is a graph showing measurement results of magnetic hysteresis of a particle dispersion element at 300 K.

Next, an external magnetic field ($H_0$) was applied to a recording surface of the particle dispersion element 1 at 300 K in the perpendicular direction, and magnetic hysteresis of the particle dispersion element 1 was measured, and thus, results as shown in FIG. 9 were obtained. A coercive force $H_c$ of the particle dispersion element 1 was 3.3 kOe ($2.63 \times 10^5$ A/m), and a square hysteresis ratio had a high value of 0.737.

Figure 10:
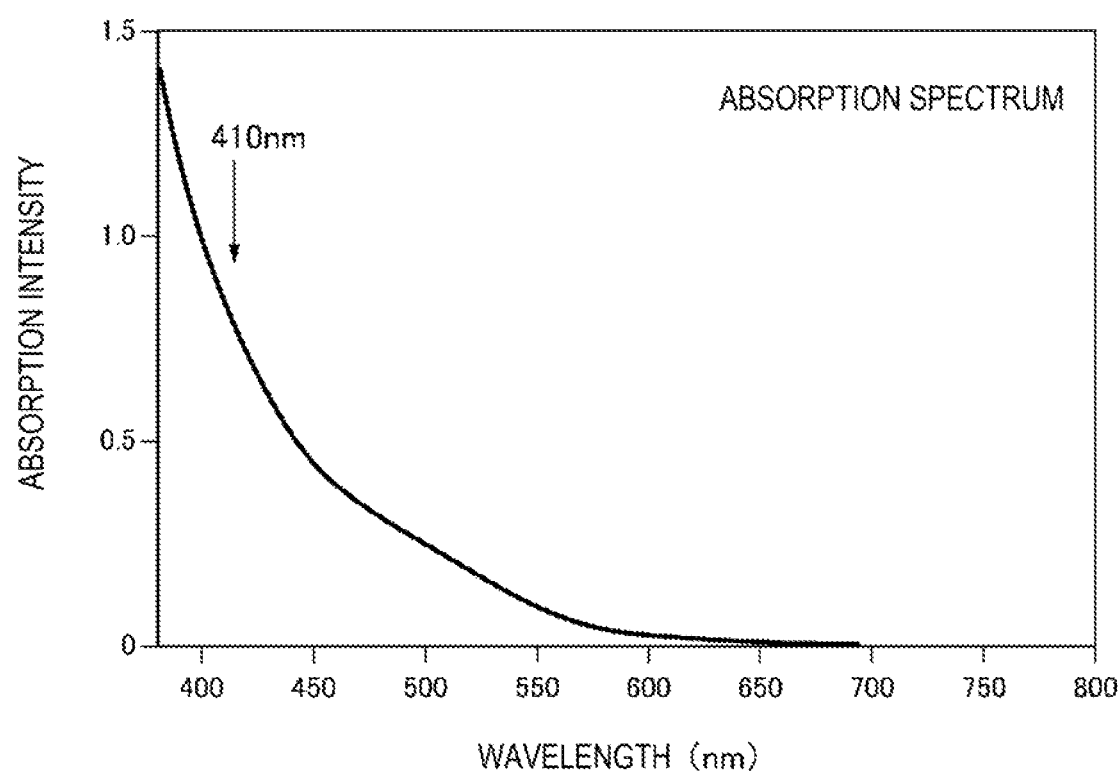
FIG. 10 is a graph showing wavelength dependency of a UV-vis absorption spectrum of a particle dispersion element.

Next, an absorption spectrum of an ultraviolet ray and a visible light ray of the particle dispersion element 1 was measured by using an ultraviolet-visible near infrared spectrophotometer JASCO V-670, manufactured by JASCO Corporation, and thus, results as shown in FIG. 10 were obtained. From FIG. 10, it was possible to check that the particle dispersion element 1 absorbed light from an ultraviolet ray to a visible light ray having a wavelength of approximately 600 nm.

(3-4-3) Laser Light Irradiation Test Using Superconductive Interference Device Meter (SQUID)

Next, the obtained particle dispersion element 1 was subjected to a laser light irradiation test using a SQUID. Here, in FIG. 10, CW laser light having a wavelength of 410 nm that was checked to be absorbed by the particle dispersion element 1 was introduced into the SQUID by using an optical fiber. The particle dispersion element 1 was attached to the tip end of the optical fiber such that the particle dispersion element 1 was capable of being irradiated with the CW laser light.

Figure 11A:
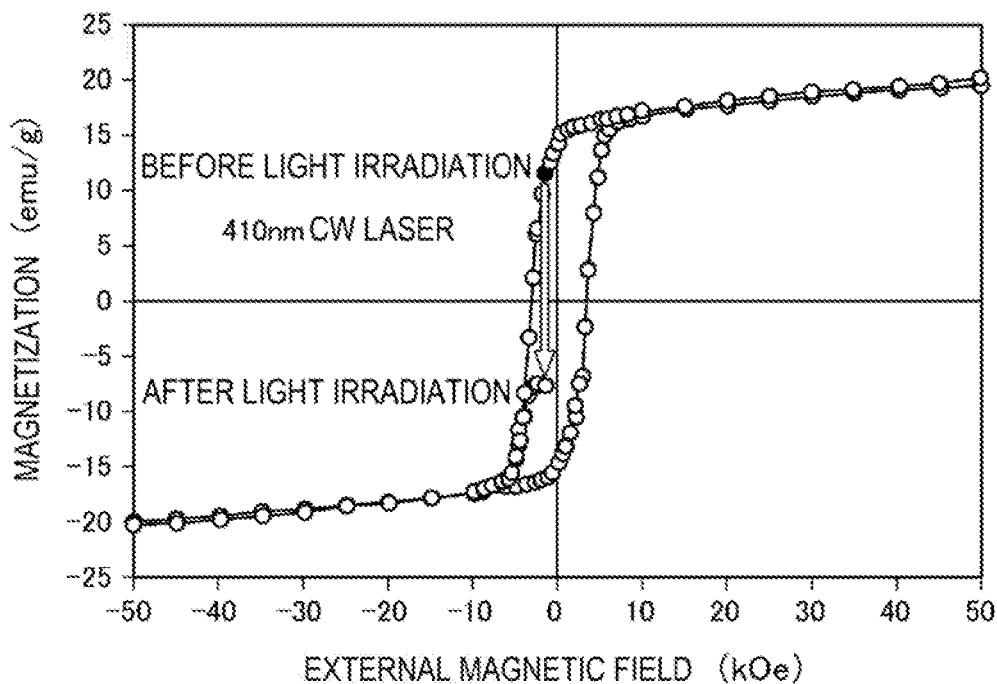
FIG. 11A is a graph showing external magnetic field dependency of magnetization of a particle dispersion element and a change in the magnetization after light irradiation. Specifically.
Figure 11B:
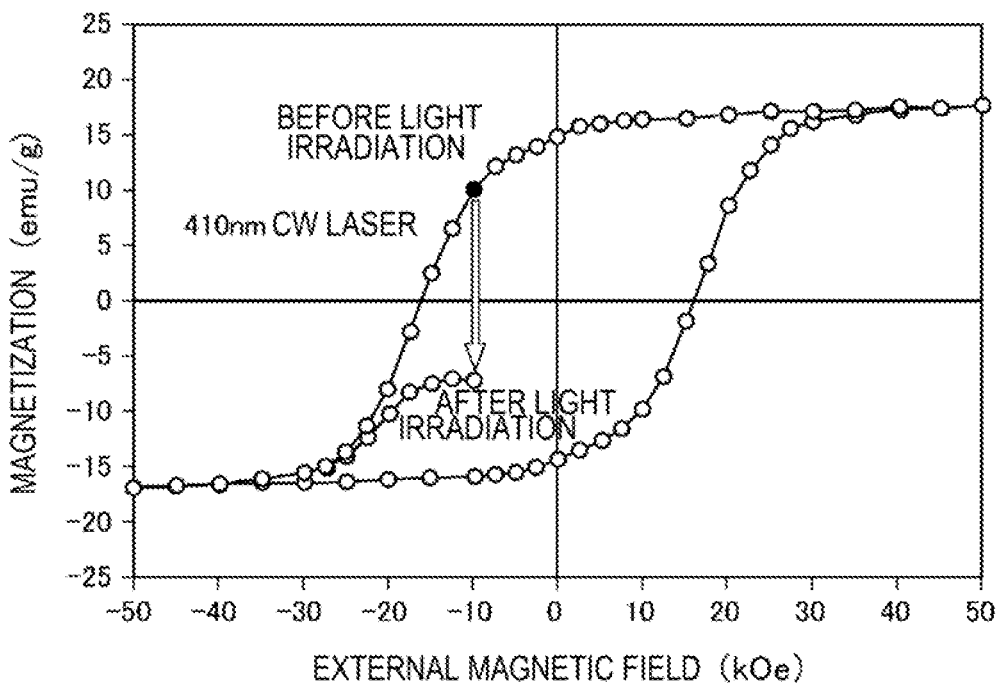
FIG. 11B is a graph enlargedly showing a part of FIG. 11A.

First, the magnetic hysteresis of the particle dispersion element 1 at 300 K before the irradiation of the CW laser light was measured, and thus, results as shown in FIG. 11A and FIG. 11B were obtained. FIG. 11B enlargedly shows a part of FIG. 11A. In FIG. 11A and FIG. 11B, a measurement result before the irradiation of the CW laser light is illustrated by a black point. In FIG. 11A and FIG. 11B, square magnetic hysteresis was measured at a part hidden by a white circle.

Subsequently, the external magnetic field $H_0$ was applied up to +50 kOe ($+3.98 \times 10^6$ A/m), and then, was swept to $-2$ kOe ($-1.59 \times 10^5$ A/m) from +50 kOe ($+3.98 \times 10^6$ A/m), and the particle dispersion element 1 was irradiated with the CW laser light having a wavelength of 410 nm, in a state where the external magnetic field $H_0$ of $-2$ kOe ($-1.59 \times 10^5$ A/m) was applied. As a result thereof, as shown in FIG. 11A and FIG. 11B, it was possible to check that the magnetization started to decrease and the magnetization was inverted.

Then, in a case where in a state of being subjected to the magnetization inversion, the external magnetic field $H_0$ was swept to −50 kOe (−3.98×10$^6$ A/m) from −2 kOe (−1.59×10$^5$ A/m), and then, the external magnetic field $H_0$ was increased again, approximately the same magnetic hysteresis as that before the light irradiation was measured. Note that, in FIG. 11A and FIG. 11B, a white circle represents a measurement result after the light irradiation.

From the results described above, it was possible to check that the magnetization inversion that was obtained by the external magnetic field $H_0$ in the vicinity of approximately −4 kOe (−3.2×10$^5$ A/m) was obtained by the external magnetic field $H_0$ of approximately −2 kOe (−1.59×10$^5$ A/m), before the light irradiation. Accordingly, it was possible to check that even in a case where an absolute value of the external magnetic field $H_0$ was decreased, the magnetization inversion was assisted with the CW laser light by performing the light irradiation, and thus, the magnetization inversion was capable of being performed. As described above, it can be said that it was possible to check the effectiveness of heat assisted magnetic recording (HAMR) even in the particle dispersion element 1 using the epsilon iron oxide particles having a high coercive force $H_c$.

(3-4-4) Laser Light Irradiation Test Using Faraday Effect Measurement Device

Here, in a general recording mode using the particle dispersion element 1, information is recorded while sliding the particle dispersion element 1. For this reason, a recording speed to the particle dispersion element 1 is also important. For example, it is desirable that information can be recorded in the particle dispersion element 1 within 20 ns, in consideration of a sliding speed of the particle dispersion element 1.

Therefore, here, the validation test of the magnetization inversion of the particle dispersion element 1 was performed by using pulsed laser light. YAG laser light having a pulse width of 10 ns and a wavelength of 532 nm was used as the pulsed laser light such that the particle dispersion element 1 was irradiated with the YAG laser light. First, the particle dispersion element 1 was irradiated with the YAG laser light, and wavelength dependency of a Faraday ellipticity of the particle dispersion element 1 at a room temperature was examined by using a Faraday effect measurement device. As a result thereof, results as shown in FIG. 12 were obtained.

Figure 12:
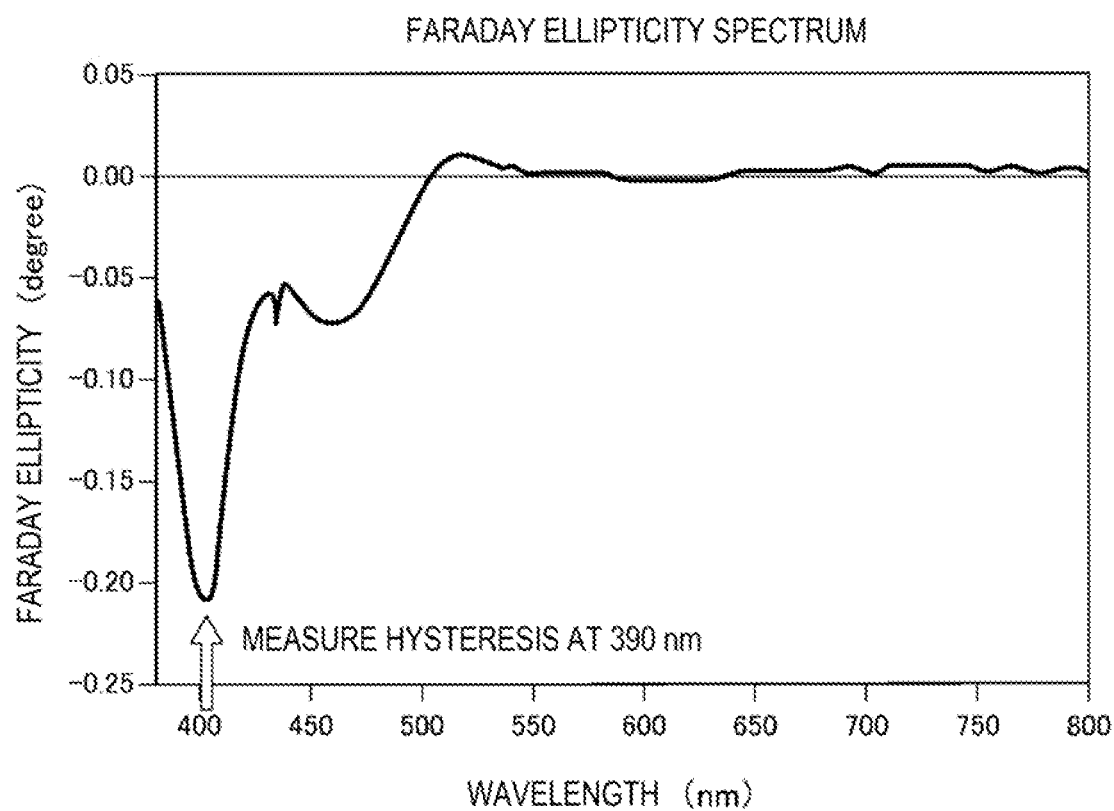
FIG. 12 is a graph showing wavelength dependency of a Faraday ellipticity of a particle dispersion element.
Figure 13:
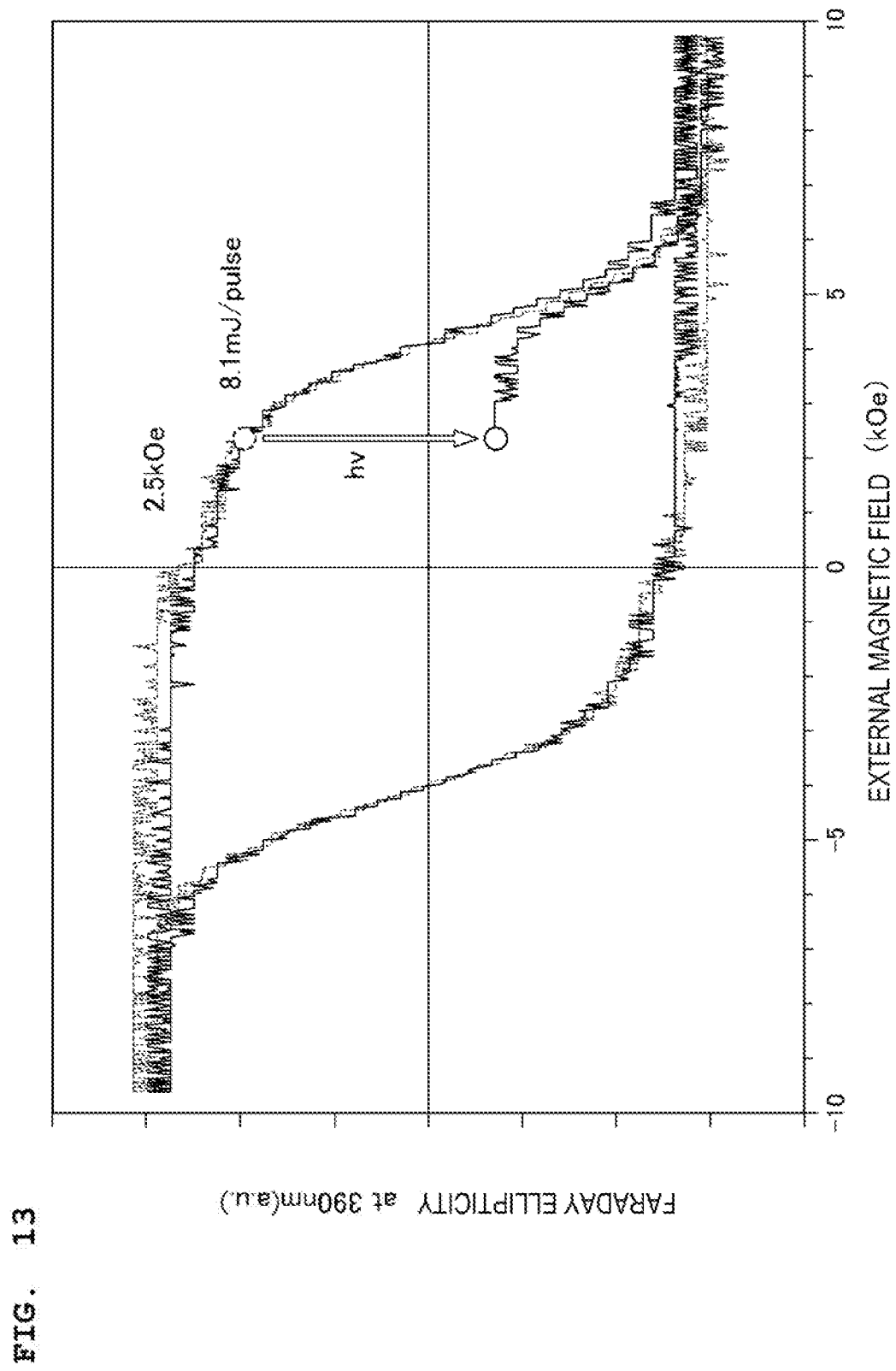
FIG. 13 is a graph showing external magnetic field dependency of a Faraday ellipticity at a wavelength of 390 nm and a change in the Faraday ellipticity after light irradiation of 8.1 mJ/pulse.
Figure 14:
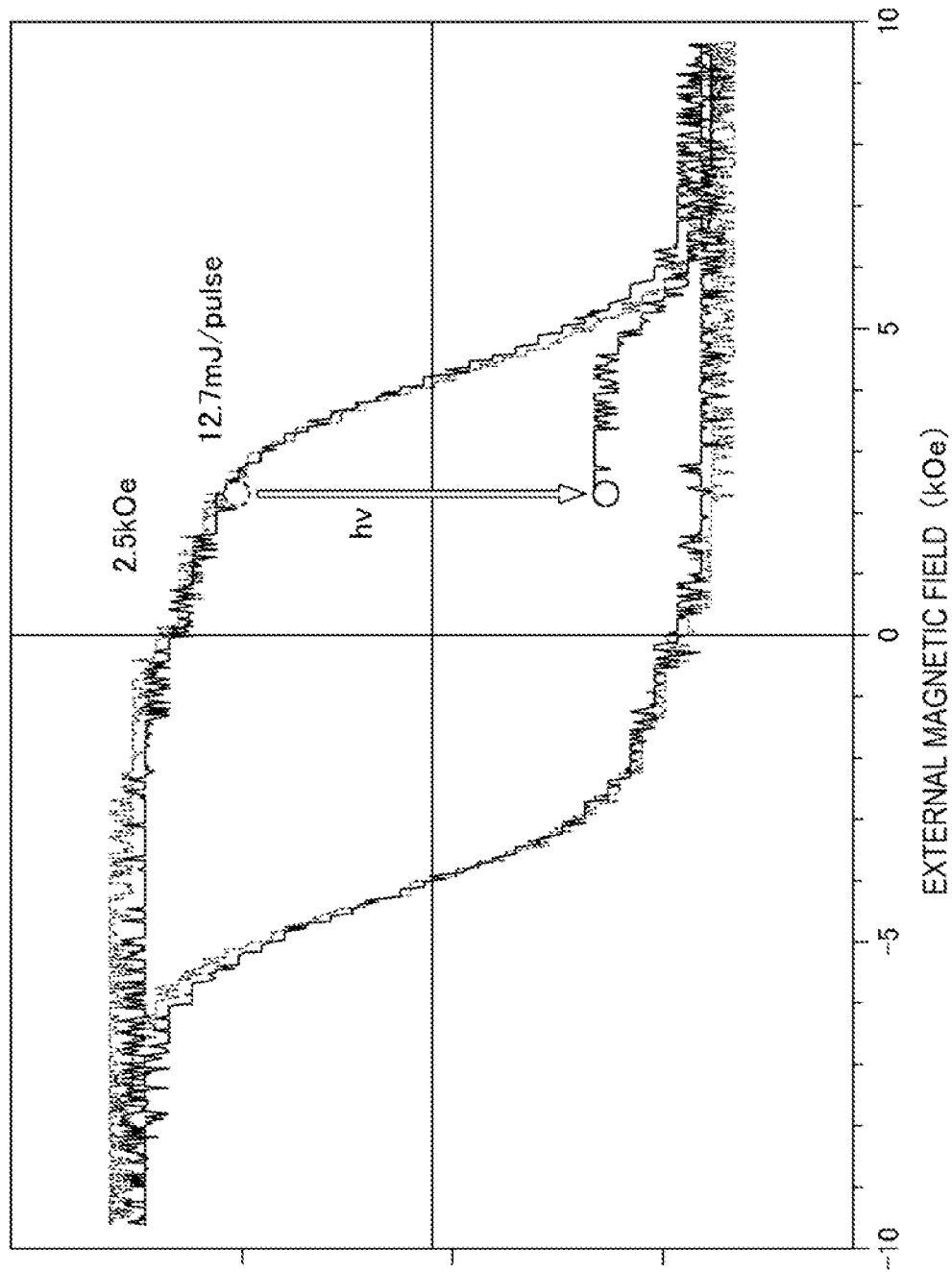
FIG. 14 is a graph showing external magnetic field dependency of a Faraday ellipticity at a wavelength of 390 nm and a change in the Faraday ellipticity after light irradiation of 12.7 mJ/pulse.

From FIG. 12, it was checked that the Faraday ellipticity was maximized in the vicinity of a wavelength of 390 nm. Next, the hysteresis of the Faraday ellipticity was measured at a wavelength of 390 nm, and thus, results as shown in FIG. 13 were obtained. Note that, the value of the Faraday ellipticity is negative at a wavelength of 390 nm, and thus, as shown in FIG. 13, the hysteresis is in a shape in which the loop of the magnetic hysteresis in FIG. 11A and FIG. 11B, which was measured by the SQUID, is upside down. As shown in FIG. 14, a loop shape of the hysteresis of the Faraday ellipticity corresponded to a loop shape of the magnetic hysteresis in FIG. 11A and FIG. 11B, which was measured by the SQUID.

Next, the external magnetic field $H_0$ was set to +2.5 kOe (+1.99×10$^5$ A/m), and the particle dispersion element 1 was irradiated with pulsed YAG laser light of 8.1 mJ/pulse, and thus, the magnetization inversion of the particle dispersion element 1 was checked. Accordingly, it was possible to check that the magnetization inversion of the epsilon iron oxide particles was assisted even with pulsed light of 10 nanoseconds, and even in a case where the external magnetic field $H_0$ was decreased, the magnetization inversion was capable of being performed.

Next, as with before the light irradiation, the hysteresis was measured by increasing the external magnetic field $H_0$, and then, by decreasing again the external magnetic field $H_0$, and thus, it was possible to check that the loop was capable of being initialized to the same loop as that of the hysteresis before the light irradiation.

Next, the external magnetic field $H_0$ was set again to +2.5 kOe (+1.99×10$^5$ A/m), and the particle dispersion element 1 was irradiated with pulsed YAG laser light of 12.7 mJ/pulse, and thus, as shown in FIG. 14, the magnetization inversion of the particle dispersion element 1 was checked. In addition, the external magnetic field $H_0$ was changed, the initial hysteresis before the light irradiation was set, and the external magnetic field $H_0$ was set again to +2.5 kOe (+1.99×10$^5$ A/m), and the particle dispersion element 1 was irradiated with pulsed YAG laser light of 16.0 mJ/pulse, and thus, as shown in FIG. 15, the magnetization inversion of the particle dispersion element 1 was checked.

Figure 15:
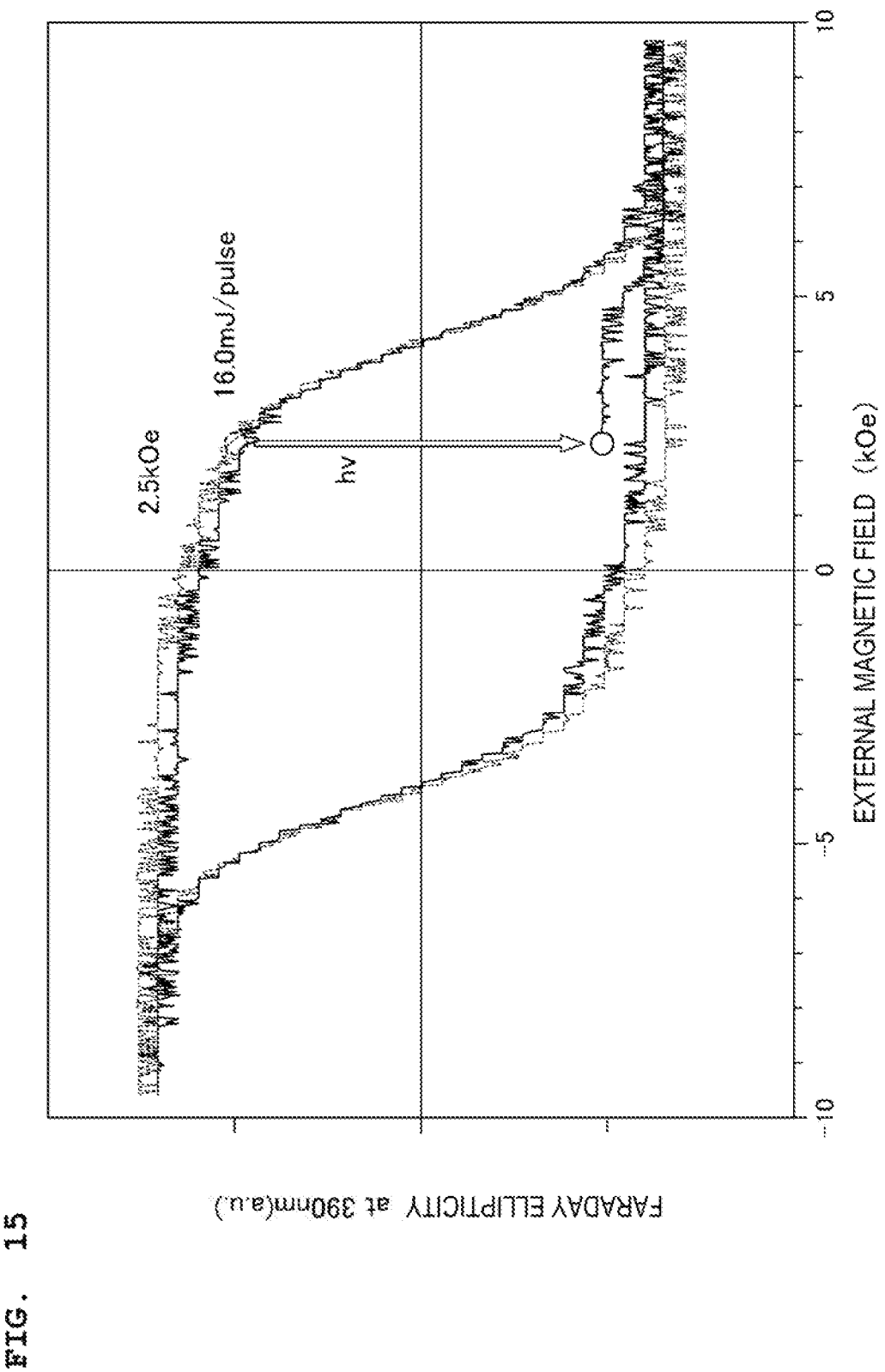
FIG. 15 is a graph showing external magnetic field dependency of a Faraday ellipticity at a wavelength of 390 nm and a change in the Faraday ellipticity after light irradiation of 16.0 mJ/pulse.

From the results of FIG. 13, FIG. 14, and FIG. 15, it was possible to check that in a case where light intensity per one pulse is increased, a magnetization inversion amount was also increased.

As described above, in the embodiment described above, the case of recording information in the particle dispersion element 1 by the application of the external magnetic field and the irradiation of light having predetermined intensity has been described as the recording of information in the magnetic recording medium, but the invention is not limited thereto, and as shown in FIG. 13, FIG. 14, and FIG. 15, described above, information may be recorded to the particle dispersion element 1 in a multi-valued manner (in a state in which binary or more multiple values can be identified by a multistage magnetization state) by changing the intensity of light in accordance with information to be recorded, at the time of recording information in the particle dispersion element 1 by the application of the external magnetic field and the irradiation of light.

(4) Reproduction Device

Figure 16:
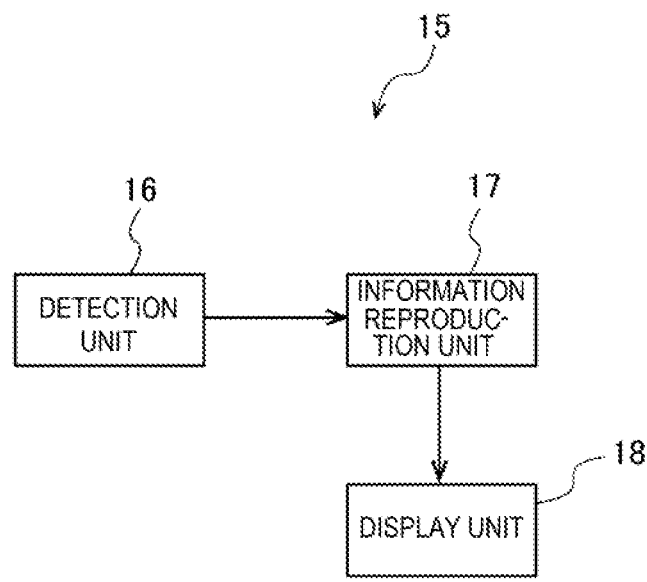
FIG. 16 is a block diagram illustrating a configuration of a reproduction device.

Next, a reproduction device that is capable of reproducing the information of the particle dispersion element 1 in which the information is recorded in a multi-valued manner will be described below. As illustrated in FIG. 16, a reproduction device 15 includes a detection unit 16, an information reproduction unit 17, and a display unit 18. The detection unit 16, for example, is a magnetic head, and is disposed to be close to or in contact with the recording surface of the particle dispersion element 1. The detection unit 16 scans on the particle dispersion element 1, and detects the magnetization of the particle dispersion element 1, and outputs detection results that are obtained to the information reproduction unit 17.

The information reproduction unit 17, reproduces the information according to the intensity of the magnetization, on the basis of the intensity of the magnetization that is detected from the particle dispersion element 1, and allows the display unit 18 to display the information. Here, when the information is recorded in the particle dispersion element 1 by the irradiation of light and the application of the external magnetic field, in a case where the intensity of light decreases, the magnetization inversion amount also decreases. As a result thereof, when the reproduction is performed by the reproduction device 15, the intensity of the magnetization that is detected from the particle dispersion element 1 also decreases.

On the other hand, when the information is recorded in the particle dispersion element 1 by the irradiation of light and the application of the external magnetic field, in a case where the intensity of the light increases, the magnetization inversion amount also increases. As a result thereof, when the reproduction is performed by the reproduction device 15, the intensity of the magnetization that is detected from the particle dispersion element 1 also increases.

As described above, multi-valued information is recorded to the particle dispersion element 1 by adjusting the intensity of the light when the information is recorded in the particle dispersion element 1. In addition, when the information is recorded by the external magnetic field and the light, even in a case where the information is recorded in the particle dispersion element 1 in a multi-valued manner by changing the intensity of the light, the magnetization of the particle dispersion element 1 is detected by the reproduction device 15, and thus, the multi-valued information can be reproduced from a difference in the intensity of the magnetization at the time of being detected.

(5) High-Speed Response Element Using Terahertz Light (5-1) Configuration of High-Speed Response Element According to Invention Using Terahertz Light In the embodiment described above, a case where the magnetization 3 is inverted in response to light has been described, and here, a high-speed response element that responds the magnetization at a high speed by using terahertz light will be described.

In the invention, the epsilon iron oxide particles used as a magnetic material are capable of absorbing terahertz light in a millimeter wave (30 GHz to 300 GHz) region by a resonance phenomenon of the magnetization. The epsilon iron oxide particles are irradiated with the terahertz light, and thus, a high-speed movement of the magnetization is induced.

Figure 17:
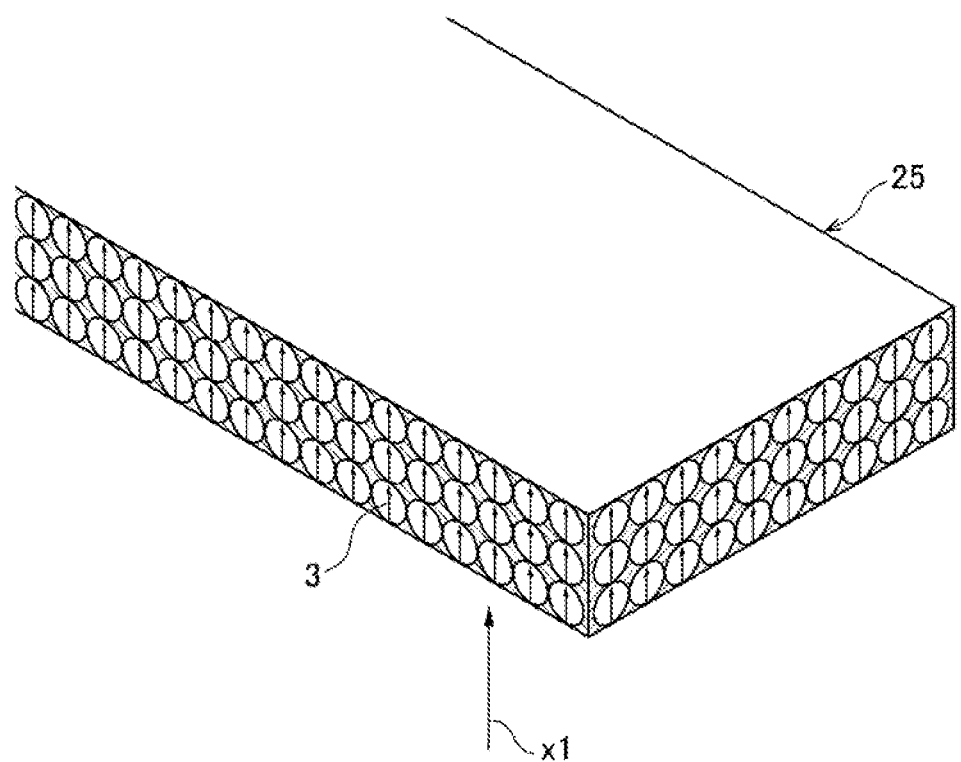
FIG. 17 is a schematic view illustrating a configuration of a high-speed response element.
Figure 18:
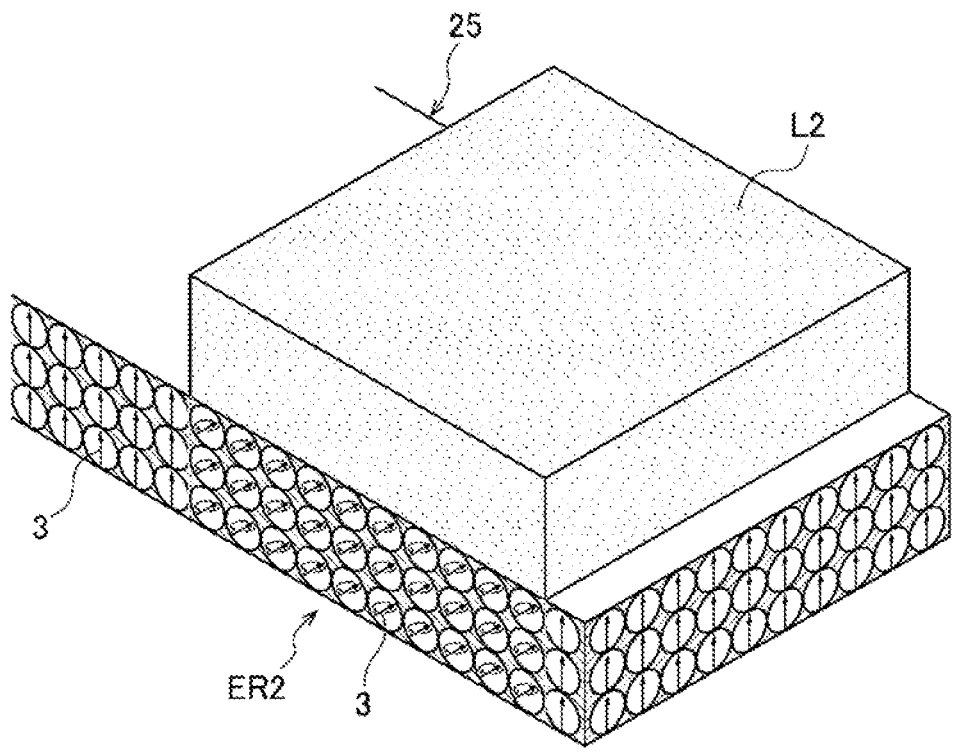
FIG. 18 is a schematic view illustrating a state when a high-speed response element is irradiated with terahertz light.

FIG. 17 illustrates a high-speed response element 25 in which a magnetization state responds at a high speed in accordance with the irradiation of the terahertz light. As illustrated in FIG. 17, for example, when the high-speed response element 25 is not irradiated with the terahertz light, the magnetization 3 is directed in the initial orientation direction x1. As illustrated in FIG. 18, in a case where the high-speed response element 25 is irradiated with terahertz light L2, a precession movement of the magnetization 3 in the region ER2 to which the terahertz light L2 is applied is induced, and the magnetization state is changed.

Such a change in the magnetization state occurs in conformance with a timing when the terahertz light L2 is applied. Specifically, the precession movement of the magnetization 3 is induced immediately after the high-speed response element 25 starts to be irradiated with the terahertz light L2, and the magnetization state immediately starts to change. In addition, in a case where the irradiation of the terahertz light L2 to the high-speed response element 25 ends, the precession movement of the magnetization 3 immediately stops, and the magnetization state returns to the initial state.

In the configuration described above, the high-speed response element 25 contains the epsilon iron oxide particles, and the magnetization state responds in conformance with a timing when the terahertz light L2 is applied. Accordingly, the magnetization state responds at a high speed in conformance with a timing when the terahertz light L2 is applied, and thus, the high-speed response element 25 can be applied to various circuit elements in which high-speed response is required. Note that, here, the terahertz light may be terahertz light that is continuously applied to the high-speed response element 25, in addition to the pulsed terahertz light (hereinafter, referred to as pulsed terahertz light).

(5-2) Validation Test Relevant to Responsiveness of Magnetization Due to Irradiation of Pulsed Terahertz Light Next, when the high-speed response element 25 was irradiated with the pulsed terahertz light L2, the responsiveness of the magnetization with respect to the pulsed terahertz light L2 was examined. In the validation test, epsilon iron oxide particles containing $\varepsilon\text{-Fe}_2\text{O}_3$ crystals were used as a magnetic material, and the high-speed response element 25 was prepared in the same procedure as that of "(2) Particle Dispersion Element Containing Epsilon Iron Oxide Particles" described above.

Figure 19:
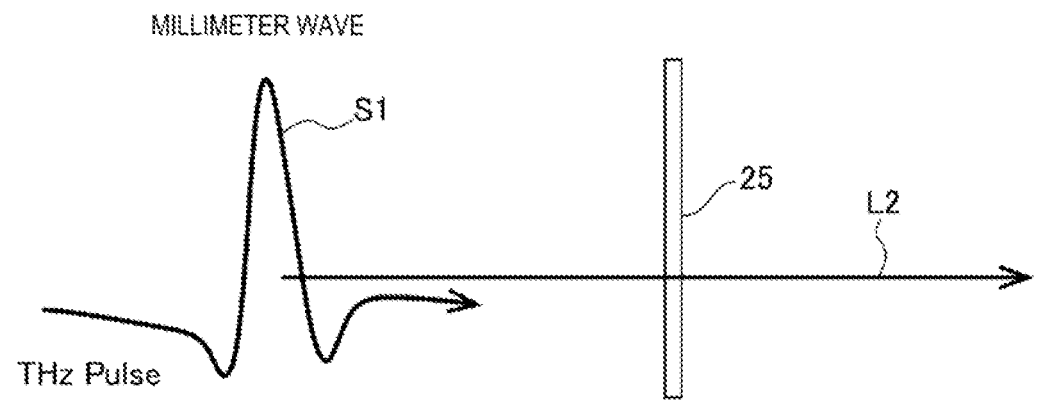
FIG. 19 is a schematic view for describing a validation test for irradiating a high-speed response element with pulsed terahertz light.

As illustrated in FIG. 19, in the validation test, the pulsed terahertz light L2 was applied toward one surface of the high-speed response element 25. Note that, the pulsed terahertz light L2 applied to the high-speed response element 25 was set to a pulsed signal S1.

Here, pulsed terahertz light L2 having high intensity was used as the pulsed terahertz light L2, and the response of the magnetization was observed by using a Faraday effect measurement device. The pulsed terahertz light L2 used in the measurement had a maximum peak amplitude of 400 kV/cm.

Figure 20:
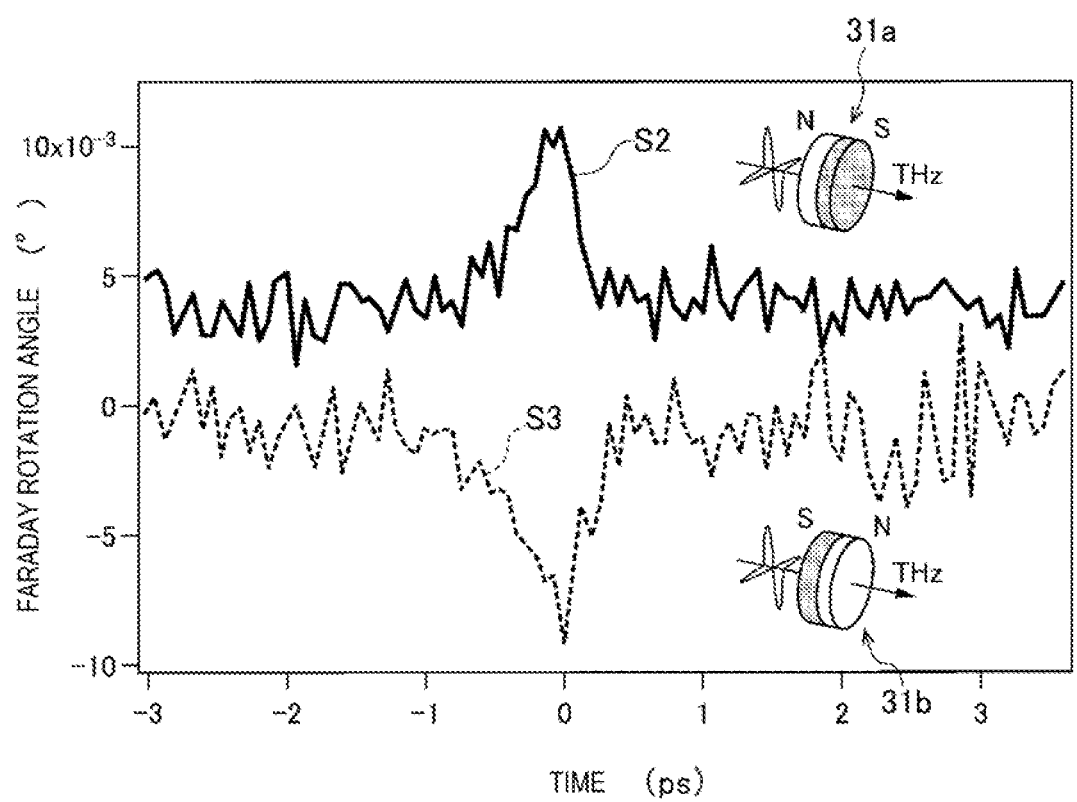
FIG. 20 is a graph showing measurement results of a Faraday rotation angle when a high-speed response element is irradiated with pulsed terahertz light from two magnetization directions.

As shown in FIG. 20, a Faraday rotation angle was examined with respect to each of a case where a high-speed response element 31a was provided such that the magnetization is directed in a direction opposite to an irradiation direction of the pulsed terahertz light L2 and a case where a high-speed response element 31b was provided such that the magnetization was directed in the irradiation direction of the pulsed terahertz light L2. Specifically, high-speed spectrometry of the Faraday rotation angle was performed by a pump-probe method according to terahertz excitation and optical Faraday detection.

As shown in FIG. 20, a large peak appeared at the original point of an irradiation time of the pulsed terahertz light L2 in both of the cases, and thus, it was possible to check that the Faraday rotation angle was greatly changed, and high-speed response of the magnetization was observed. Such a change is detected as a decrease in the magnetization in the thickness direction of the high-speed response elements 31a and 31b due to a slight tilt of the oriented magnetization with respect to a thickness direction of the high-speed response elements 31a and 31b in accordance with a magnetic field component of the pulsed terahertz light L2. In addition, it was also checked that the sings of signals S2 and S3 to appear were inverted by changing the direction of the magnetization.

Figure 21:
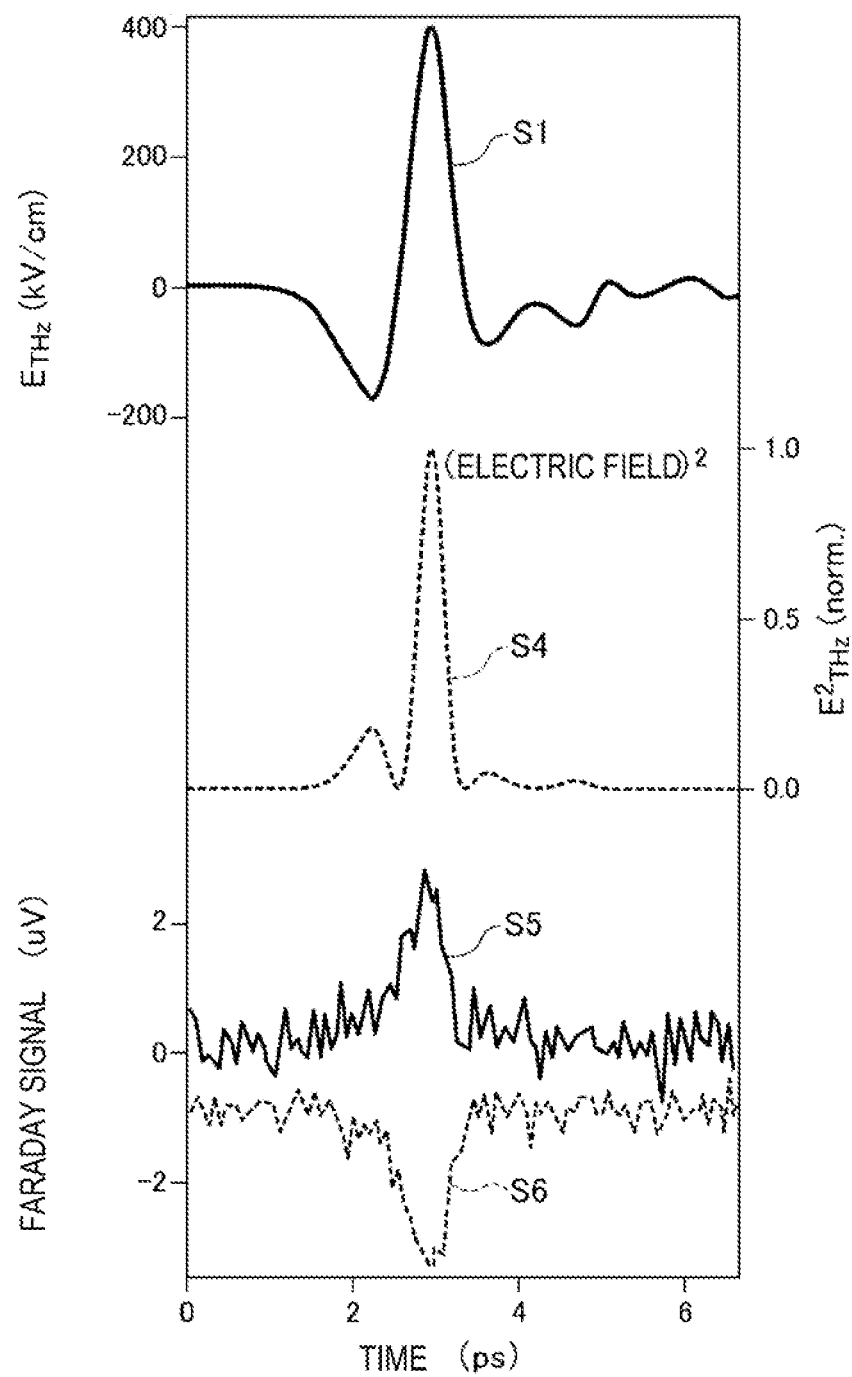
FIG. 21 is a graph showing responsiveness of a Faraday rotation angle with respect to pulsed terahertz light.

Next, the signal S1 of the pulsed terahertz light L2, a signal S4 obtained by squaring an electric field of the pulsed terahertz light L2, a Faraday signal S5 of the high-speed response element 31a obtained at this time, and a Faraday signal S6 of the high-speed response element 31b were arranged on a time axis, and thus, results as shown in FIG. 21 were obtained.

It was possible to check that in the Faraday signals S5 and S6, the size of the magnetization in a perpendicular direction (a surface direction of an irradiation surface of the high-speed response elements 31a and 31b) decreases due to the inclination of magnetic moment, and the Faraday signals S5 and S6 were generated in a time equivalent to a pulse width of the pulsed terahertz light L2. In addition, it was found that a relaxation time of a decrease in the magnetization was also fast, and the magnetization was recovered in several hundreds femtoseconds (400 fs until returning from a maximum peak of the Faraday signals S5 and S6) that is a time equivalent to a decrease in the magnetization. Thus, it was possible to check that an increase or decrease of the magnetization in the perpendicular direction was capable of being induced in response to the pulsed terahertz light L2 at a high speed.

(6) Other Embodiments

The invention is not limited to this embodiment, and various modifications can be carried out within a range of the gist of the invention. For example, it has been described that the particle dispersion element is applied as the magnetic recording medium, and for example, various magnetic recording media such as a magnetic tape or a magnetic disk may be applied.

In the embodiment described above, the magnetic field application unit 11 including the first coil portion 11a and the second coil portion 11b that generate the external magnetic field $H_0$ by allowing a current to flow is applied, but the invention is not limited thereto, and a magnet or the like may be used as the magnetic field application unit. Further, it is not necessary that an electromagnetic wave is perpendicularly applied to the recording surface of the magnetic recording medium, and the electromagnetic wave may be applied from various angles.

In the embodiment described above, a case where the external magnetic field is applied, and then, light is applied and a case where light is applied, and then, the external magnetic field is applied have been described as the order of the application of the external magnetic field and the irradiation of light to the magnetic recording medium, but the invention is not limited thereto, and the application of the external magnetic field and the irradiation of light may be simultaneously performed.

REFERENCE SIGNS LIST

1 Particle dispersion element (magnetic recording medium)
10 Recording device
11 Magnetic field application unit
12 Light irradiation unit
15 Reproduction device
16 Detection unit
17 Information reproduction unit

The invention claimed is:

1. A recording method, comprising:
performing application of an external magnetic field and irradiation of pulsed laser light to a magnetic recording medium using epsilon iron oxide particles as a magnetic recording material to invert magnetization of the epsilon iron oxide particles,
wherein information is recorded in the magnetic recording medium in a multi-valued manner in which three or more multiple values can be identified corresponding to multistage magnetization states, by adjusting intensity of the pulsed laser light.

2. The recording method according to claim 1, wherein the irradiation of the pulsed laser light to the magnetic recording medium is performed after the application of the external magnetic field to the magnetic recording medium.

3. The recording method according to claim 1, wherein the application of the external magnetic field to the magnetic recording medium is performed after the irradiation of the pulsed laser light to the magnetic recording medium.

4. The recording method according to claim 1, wherein the pulsed laser light has a wavelength within an absorption spectrum of the epsilon iron oxide particles.

5. A recording device, comprising:
a magnetic field application unit that is configured to apply an external magnetic field to a magnetic recording medium containing epsilon iron oxide particles, wherein the magnetic field application unit includes a through hole that penetrates through a thickness of a facing surface that is disposed to face a recording surface of the magnetic recording medium; and
a light irradiation unit that is configured to irradiate the magnetic recording medium with pulsed laser light, wherein the light irradiation unit irradiates the magnetic recording medium with the pulsed laser light through the through hole,
wherein magnetization of the epsilon iron oxide particles is inverted by the external magnetic field and the pulsed laser light.

6. A reproduction method, comprising:
detecting magnetization of a magnetic recording medium using epsilon iron oxide particles as a magnetic recording material, in which information is capable of being recorded in a multi-valued manner in which three or more multiple values can be identified corresponding to multistage magnetization states, by adjusting intensity of the pulsed laser light; and
reproducing information in accordance with intensity of the magnetization, on the basis of the intensity of the magnetization detected from the magnetic recording medium.

7. A reproduction device, comprising:
a detection unit that is configured to detect magnetization of a magnetic recording medium using epsilon iron oxide particles as a magnetic recording material, in which information is capable of being recorded in a multi-valued manner in which three or more multiple values can be identified corresponding to multistage magnetization states, by adjusting intensity of the pulsed laser light; and
an information reproduction unit that is configured to reproduce information in accordance with intensity of the magnetization, on the basis of the intensity of the magnetization detected from the magnetic recording medium.

8. A high-speed response element, containing:
epsilon iron oxide particles,
wherein a magnetization state responds in conformance with a timing when pulsed terahertz light is applied, wherein, in a response of the magnetization state, a magnetization in a perpendicular direction to a pulsed terahertz light irradiation surface of the high-speed response element increases or decreases.

9. A recording method, comprising:
performing application of an external magnetic field and irradiation of pulsed laser light to a magnetic recording medium using epsilon iron oxide particles as a magnetic recording material to invert magnetization of the epsilon iron oxide particles,
wherein information is recorded within 20 ns.

10. The high-speed response element according to claim 8, wherein the magnetization state responds within 1 ps.

11. A recording device, comprising:
a magnetic field application unit that is configured to apply an external magnetic field to a magnetic recording medium containing epsilon iron oxide particles, wherein the magnetic field application unit includes a through hole that penetrates through a thickness of a facing surface that is disposed to face a recording surface of the magnetic recording medium; and
a light irradiation unit that is configured to irradiate the magnetic recording medium with light, wherein the light irradiation unit irradiates the magnetic recording medium with the light through the through hole,
wherein magnetization of the epsilon iron oxide particles is inverted by the external magnetic field and the light.

* * * * *